Figure 3B:
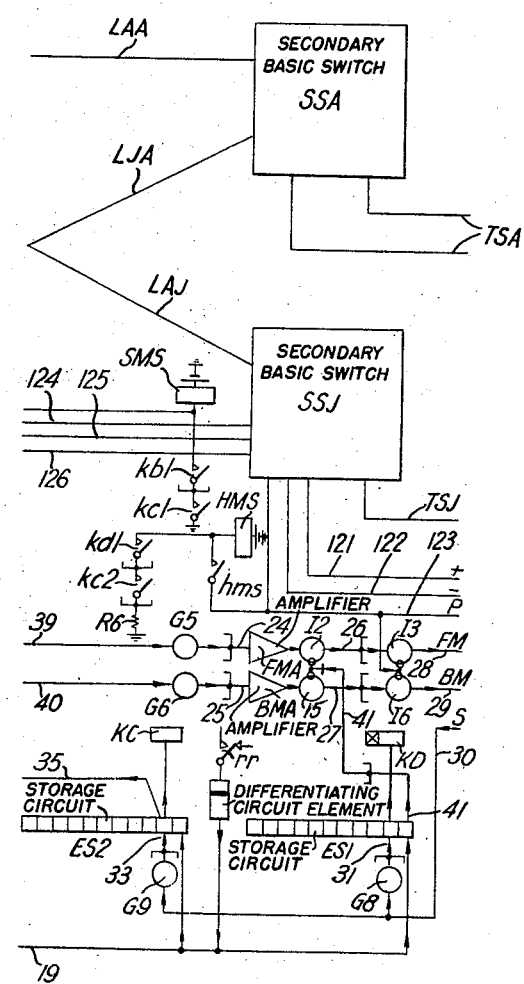

June 9, 1959　　　　　J. E. FLOOD　　　　　2,890,286
AUTOMATIC EXCHANGE SYSTEMS
Filed Dec. 2, 1954　　　　　　　　　　　　　17 Sheets-Sheet 1
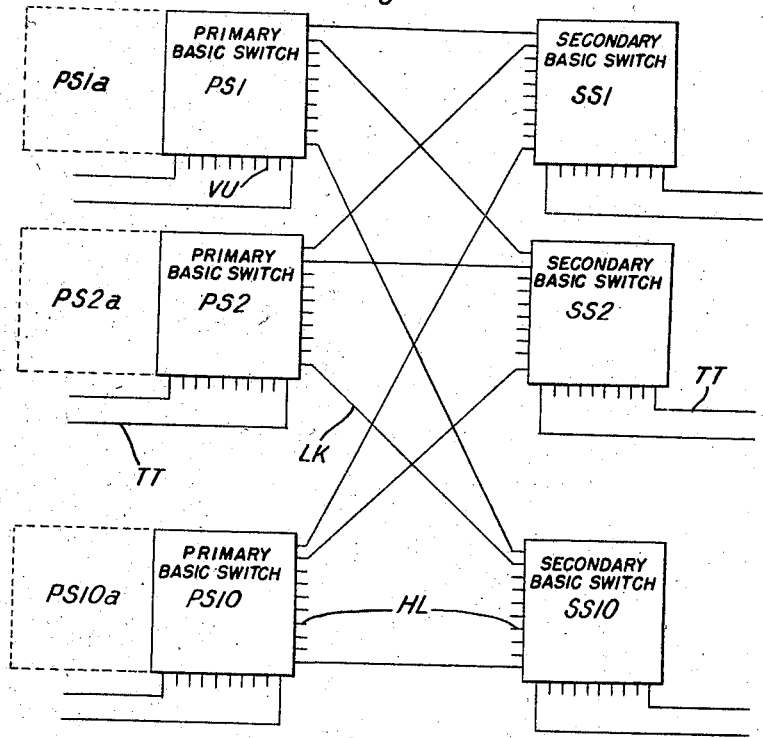
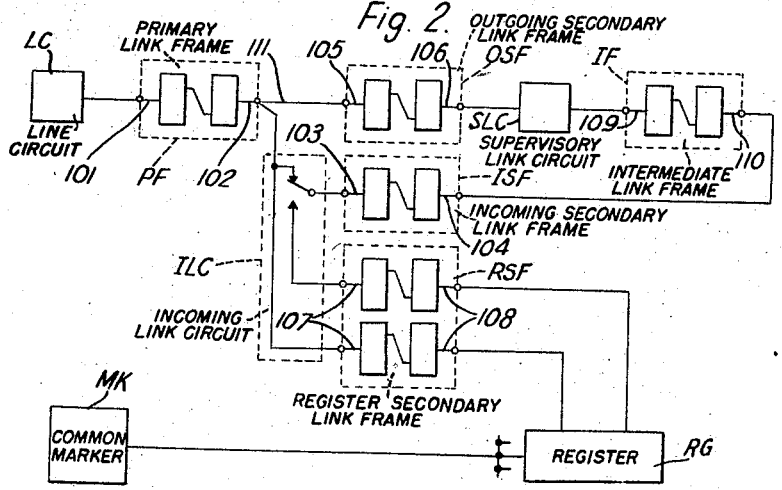
Inventor
JOHN EDWARD FLOOD
By Robert H. Harris
Attorney

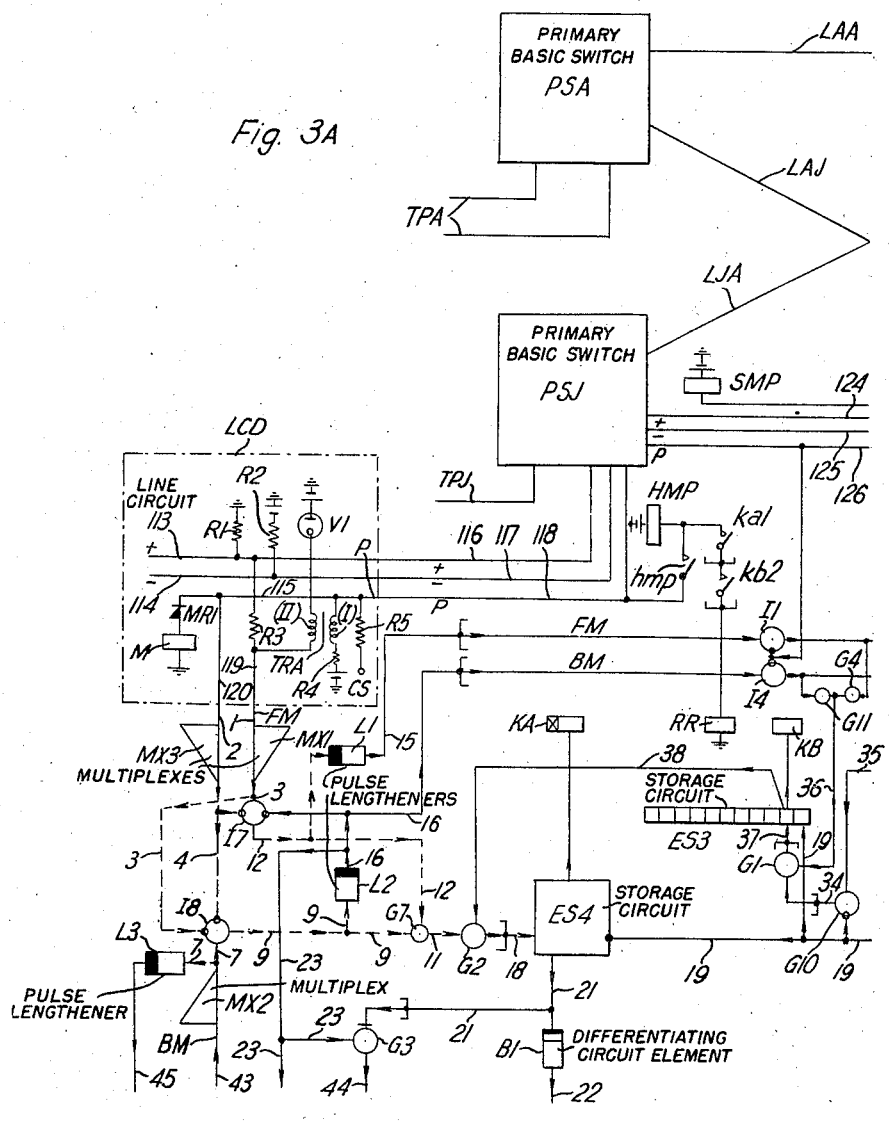

June 9, 1959　　　　J. E. FLOOD　　　　2,890,286
AUTOMATIC EXCHANGE SYSTEMS
Filed Dec. 2, 1954　　　　　　　　　　17 Sheets—Sheet 3

Inventor
JOHN EDWARD FLOOD
By
　　　　　Attorney

June 9, 1959  J. E. FLOOD  2,890,286
AUTOMATIC EXCHANGE SYSTEMS
Filed Dec. 2, 1954  17 Sheets-Sheet 4
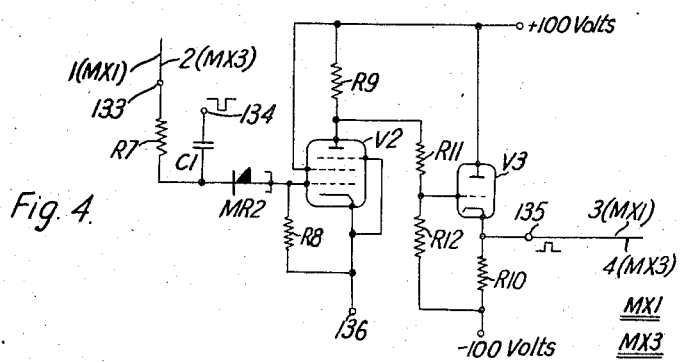
Fig. 4.
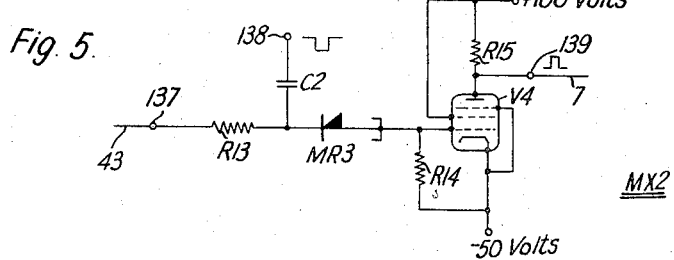
Fig. 5.
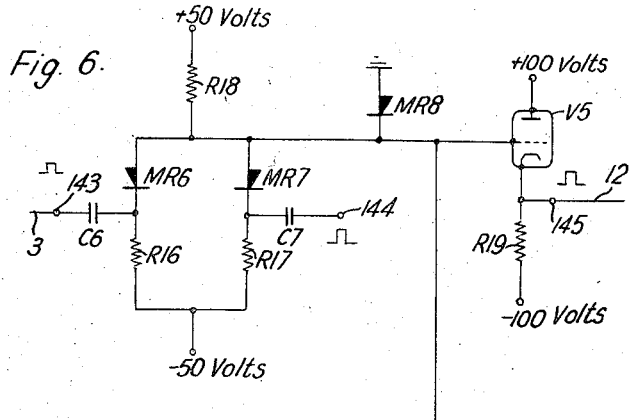
Fig. 6.
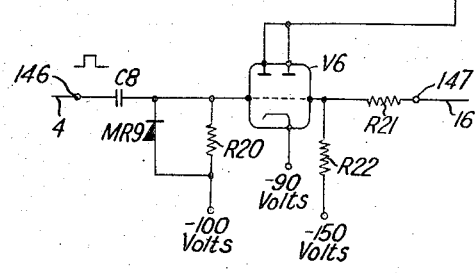
Inventor
JOHN EDWARD FLOOD
By Robert A. ...
Attorney

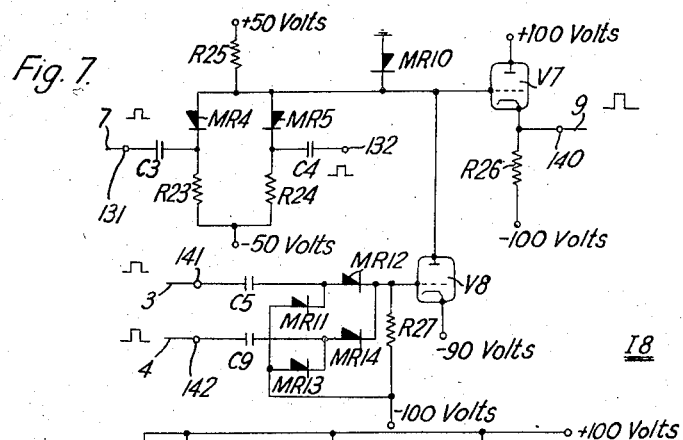
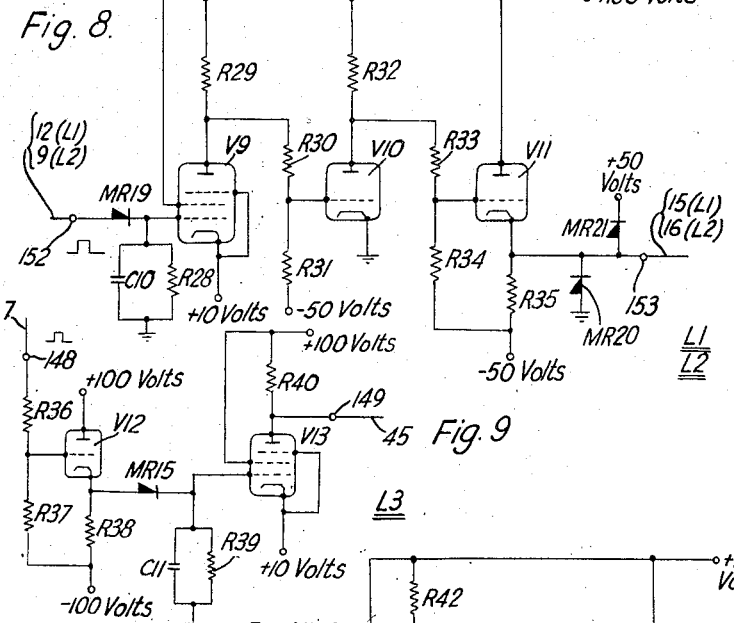

June 9, 1959   J. E. FLOOD   2,890,286
AUTOMATIC EXCHANGE SYSTEMS
Filed Dec. 2, 1954   17 Sheets-Sheet 6

Inventor
JOHN EDWARD FLOOD
By Roberts Larson
Attorney

June 9, 1959     J. E. FLOOD     2,890,286
AUTOMATIC EXCHANGE SYSTEMS
Filed Dec. 2, 1954     17 Sheets-Sheet 7

G 26, AMP, G27 & G29

Inventor
JOHN EDWARD FLOOD
By
Attorney

June 9, 1959 J. E. FLOOD 2,890,286
AUTOMATIC EXCHANGE SYSTEMS
Filed Dec. 2, 1954 17 Sheets-Sheet 8

G8, G9, ES1 & ES2

Inventor
JOHN EDWARD FLOOD
By Robert K. Lamoz
Attorney

June 9, 1959   J. E. FLOOD   2,890,286
AUTOMATIC EXCHANGE SYSTEMS
Filed Dec. 2, 1954   17 Sheets-Sheet 9
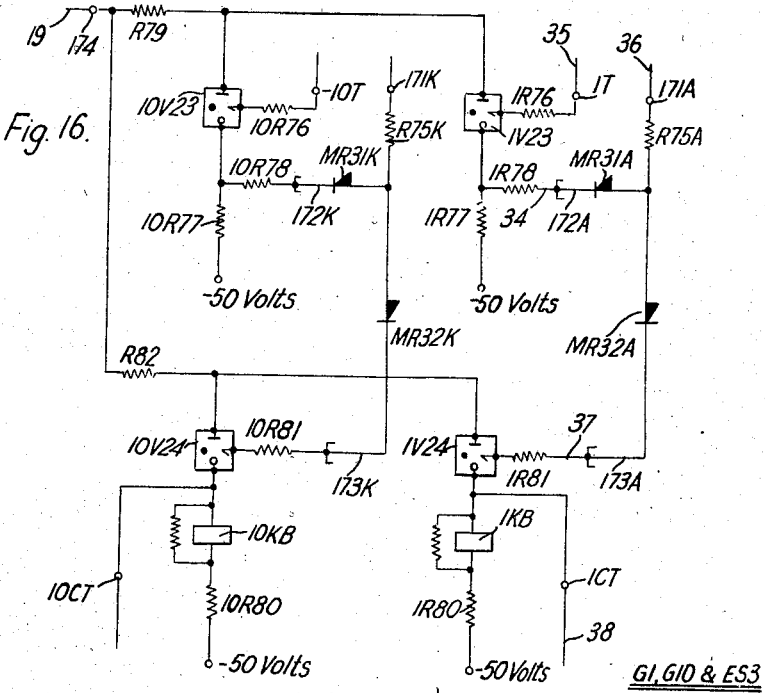
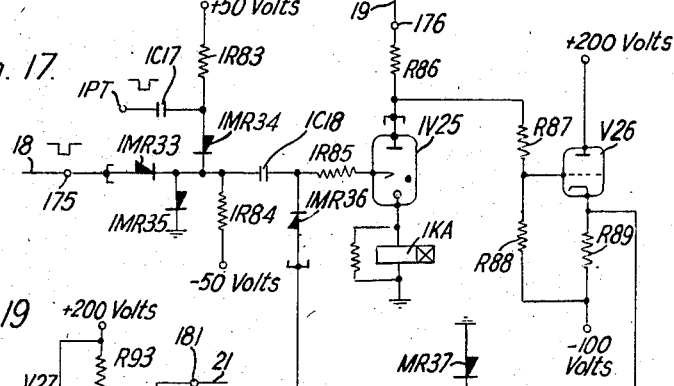
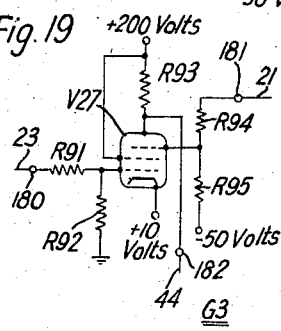
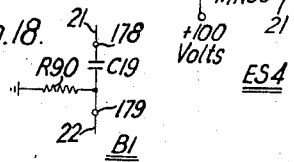
Inventor
JOHN EDWARD FLOOD
By
Attorney

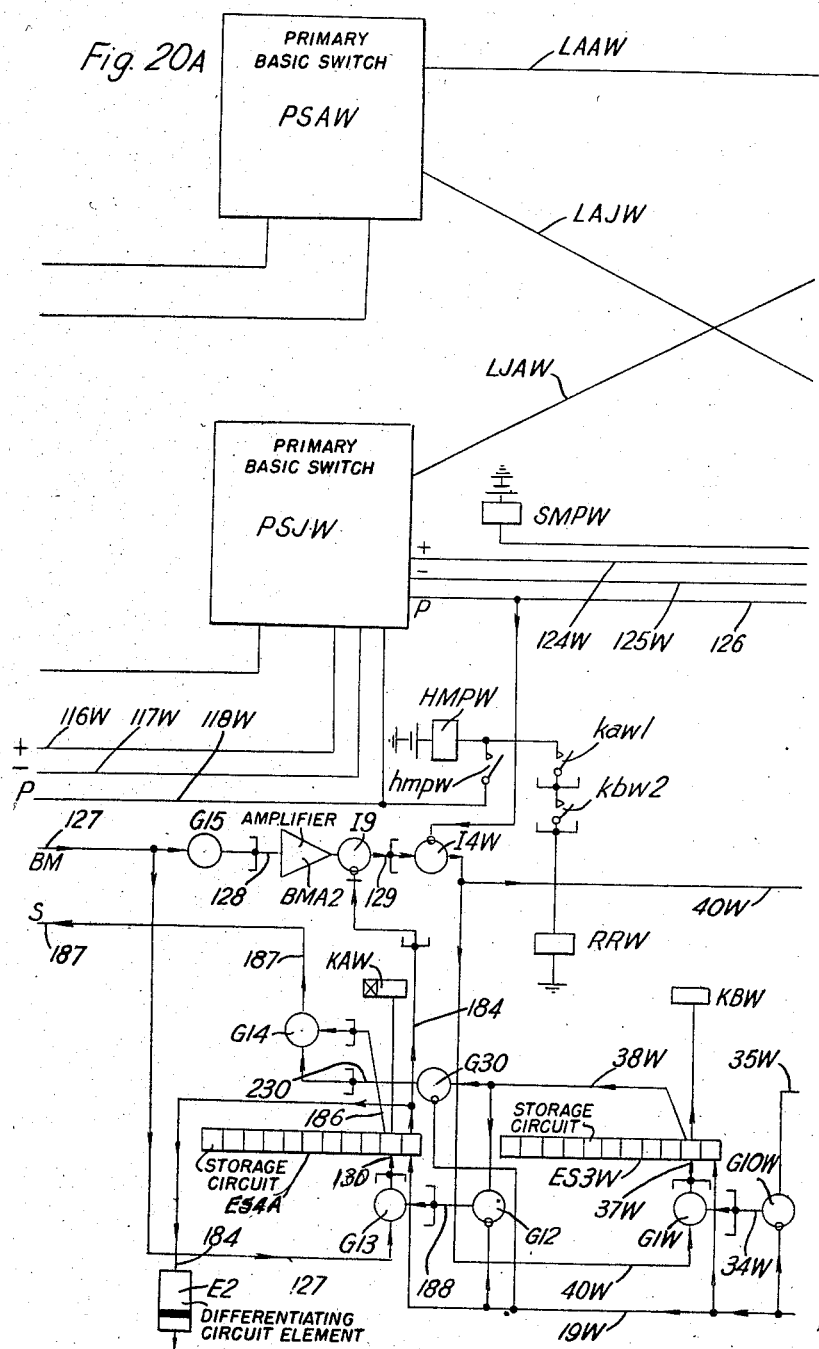

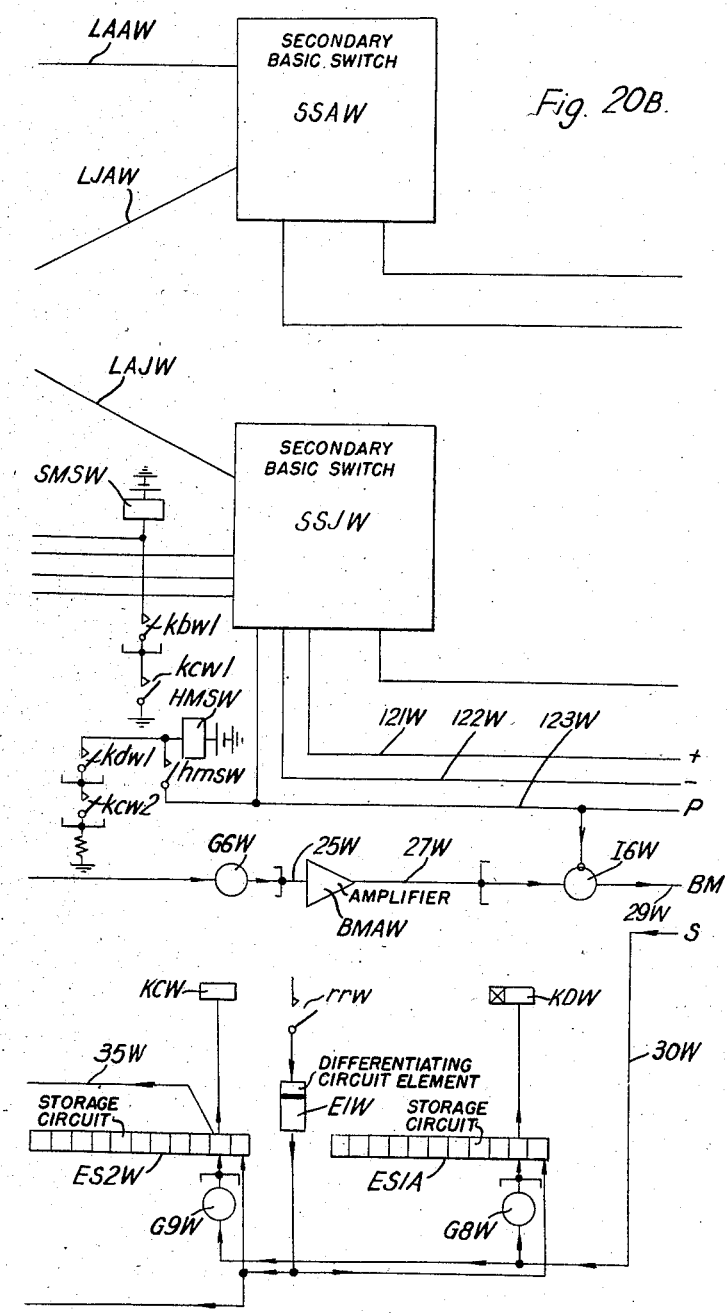

G12, G13, G14, G30 & ES4A

June 9, 1959    J. E. FLOOD    2,890,286
AUTOMATIC EXCHANGE SYSTEMS
Filed Dec. 2, 1954    17 Sheets-Sheet 13

June 9, 1959     J. E. FLOOD     2,890,286
AUTOMATIC EXCHANGE SYSTEMS

Filed Dec. 2, 1954     17 Sheets-Sheet 14

Inventor
JOHN EDWARD FLOOD
By Robert Hanson
Attorney

United States Patent Office 2,890,286
Patented June 9, 1959

2,890,286

AUTOMATIC EXCHANGE SYSTEMS

John Edward Flood, Herne Hill, London, England, assignor, by mesne assignments, to Siemens Edison Swan Limited, London, England, a British company Application December 2, 1954, Serial No. 472,727

2 Claims. (Cl. 179—18)

This invention relates to automatic exchange systems such as automatic telephone exchange systems.

As at present foreseen, the invention in its various aspects is directed to the provision of improved automatic exchange systems in which through connections such as conversational connections are set up over electro-mechanical switches, but it is possible that some of the features of the invention may find applications in a wider field, and such applications are not excluded from the scope of the invention.

The invention is especially directed to the provision of improved automatic exchange systems using electro-mechanical switches of the cross-bar type.

In the improved automatic exchange systems of the invention, use is made of switching arrangements each comprising a plurality of primary basic switches linked to a plurality of secondary basic switches, and each forming in effect a composite selector having a large number (e.g. 100 or more) terminal trunks on each side and capable of sustaining a considerable number of through connections (such as conversational connections) simultaneously. For convenience in description, the expression "link frame," currently employed to denote such a switching arrangement using cross-bar switches as the basic switches, will be used herein to mean where applicable any such switching arrangement.

Hitherto, ignoring any provision of spare markers, it has been usual, in automatic exchange systems in which the marking of a called circuit by a marker in effect controls the setting up of a through connection over a train of switches, to arrange that only the one marker serves the plurality of switches with which a marker is associated and that only one through connection can be in process of being set up over switches of such a plurality at a time, so that the connection of the calling circuit of one call to the called circuit of another call is avoided without complication. The limitation involved in this hitherto usual arrangement, that only one through connection can be in process of being set up at a time the plurality of switches associated with a marker and comprising switches in a plurality of consecutive ranks, has operated in the past to impose a limit on the size of the group of line or like circuits associated with a marker.

The present invention in one aspect has in view the provision of an improved automatic exchange system in which the marking of a called circuit by a marker in effect controls the setting up of a through connection over one or a train of link frames, and in which, although the primary and secondary basic switches of the link frames are of an electro-mechanical nature, no limit of practical importance is imposed on the size of the group of line or like circuits associated with the marker, by reason of the times taken to set up through connections over trains of the constituent basic switches of these link frames.

In another aspect, the present invention has in view the provision of an improved single-marker exchange employing link frames with electro-mechanical primary and secondary basic switches. Such an exchange may be a large (e.g. 10,000-line) one.

In yet another aspect, the present invention has in view the provision of improved arrangements, employing one or more ranks of link frames with electro-mechanical primary and secondary basic switches, for extending a connection forwards from a calling line (e.g. to a register).

According to one main feature of the invention, there is provided an automatic exchange system wherein basic switches (e.g. cross-bar switches) are arranged to constitute one or more link frames, wherein each link frame has a control circuit associated with it, and wherein an available path, for connecting a called circuit to or towards the relevant calling circuit and backward-marked as the result of the marking of the called circuit by a marker, is appropriated for the call concerned, as regards each link frame involved, by electronic equipment in or associated with the control circuit associated with the link frame, such electronic equipment being arranged to record the identities of the link and of the two terminal trunks, one on each side of the link frame, which are included in the said available path and to control the setting of the relevant basic switches of the link frame to effect a through connection between the said two terminal trunks over the said link, and the marker being rendered available for use on another call as soon as the electronic storage circuits concerned have recorded the identities of all the relevant terminal trunks included in the said available path.

According to another main feature of the invention, there is provided an automatic exchange system wherein basic switches (e.g. cross-bar switches) are arranged to constitute one or more link frames, wherein each link frame has a control circuit associated with it, and wherein an available path, for extending a connection forwards from a calling circuit (e.g. from a calling line to a register) and forward-marked as the result of the calling condition of the calling circuit, is appropriated for the call concerned, as regards each link frame involved, by electronic equipment in or associated with the control circuit associated with the link frame, such electronic equipment being arranged to record the identities of the link and of the two terminal trunks, one on each side of the link frame, which are included in the said available path and to control the setting of the relevant basic switches of the link frame to effect a through connection between the said two terminal trunks over the said link.

According to yet another main feature of the invention, there is provided an automatic exchange system wherein a link frame has associated with it a control circuit arranged so that the reception, as a consequence of the extension of a marking condition from one or more terminal trunks on one side of the link frame to one or more free terminal trunks on the other side of the link frame, of a setting-initiating condition over a particular terminal trunk on the said other side of the link frame, causes electronic storage equipment in the control circuit to be set to record over which particular terminal trunk on the said other side of the link frame the setting-initiating condition has been received and to which marked terminal trunk on the said one side of the link frame, and over which link, this particular terminal trunk on the said other side is to be connected by the link frame.

According to a further feature of the invention, there is provided an automatic exchange system wherein a link frame has associated with it a control circuit including a time-division-multiplex system, wherein a basic switch on one side of the link frame has individual to it a pulse highway of this time-division-multiplex system, the channels on this pulse highway being allocated individually, for selection controlling purposes, to those terminal trunks on the said one side of the link frame which are connected to this basic switch, wherein the apperance of a marking condition on a free one of the said terminal trunks produces the corresponding pulse train on the said pulse highway, and wherein the appropriation of a free and marked one of the said terminal trunks for a call is effected by the response of an electronic storage circuit in the control circuit to a pulse present on the said pulse highway subsequent to the appropriation for the call of a free and marked link between the said basic switch and a basic switch on the other side of the link frame.

According to a still further feature of the invention, there is provided an automatic exchange system wherein a link frame has associated with it a control circuit including a time-division-multiplex system, wherein a basic switch on one side of the link frame has individual to it a pulse highway of this time-division-multiplex system, the channels on this pulse highway being allocated individually, for selection controlling purposes, to a plurality of links between the said basic switch and basic switches on the other side of the link frame, wherein the appearance of a marking condition on a free one of the said plurality of links produces the corresponding pulse train on the said pulse highway, and wherein the appropriation of a free and marked one of the said plurality of links for a call is effected by the response of an electronic storage circuit in the control circuit to a pulse present on the said pulse highway subsequent to the appropriation for the call of a free and marked one of those terminal trunks on the said one side of the link frame which are connected to the said basic switch.

Figure 24:
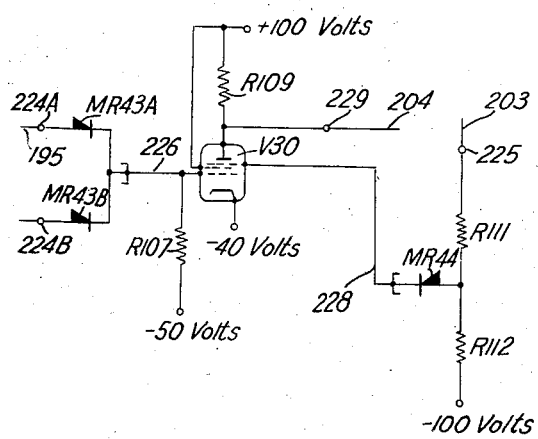
Figure 21:
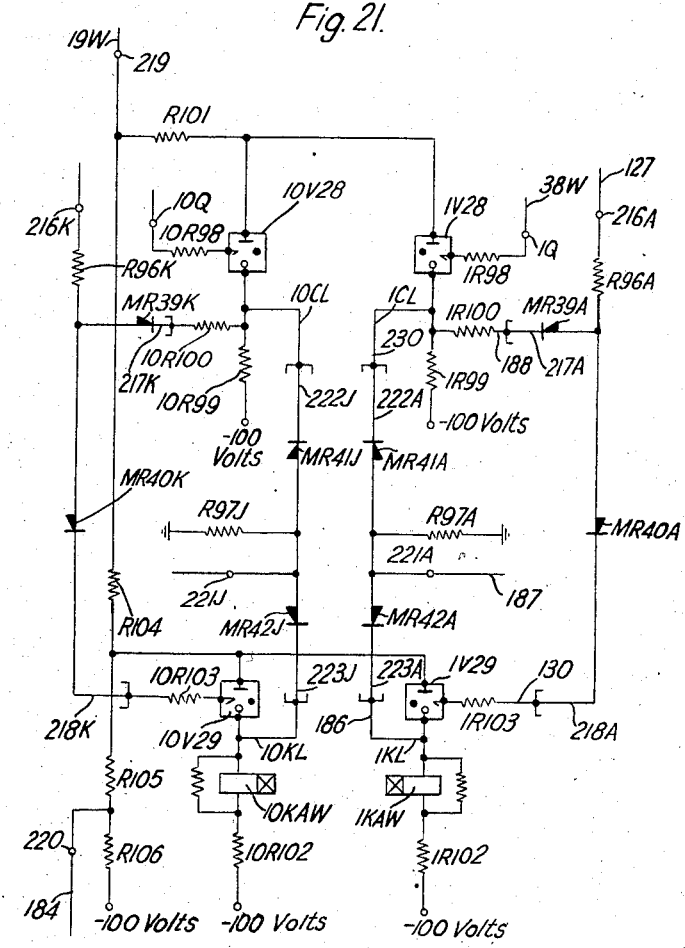
Figure 22A:
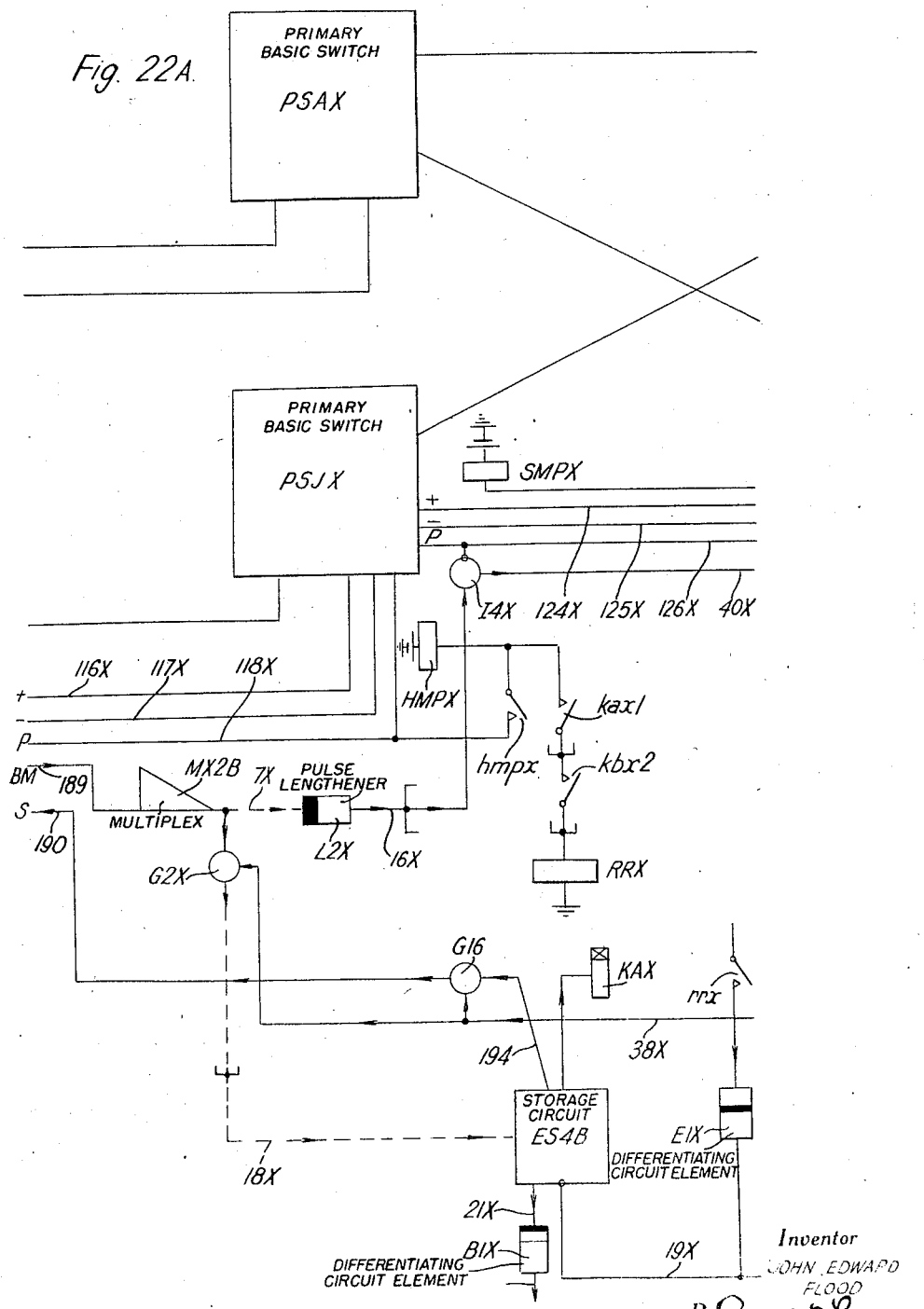
Figure 22B:
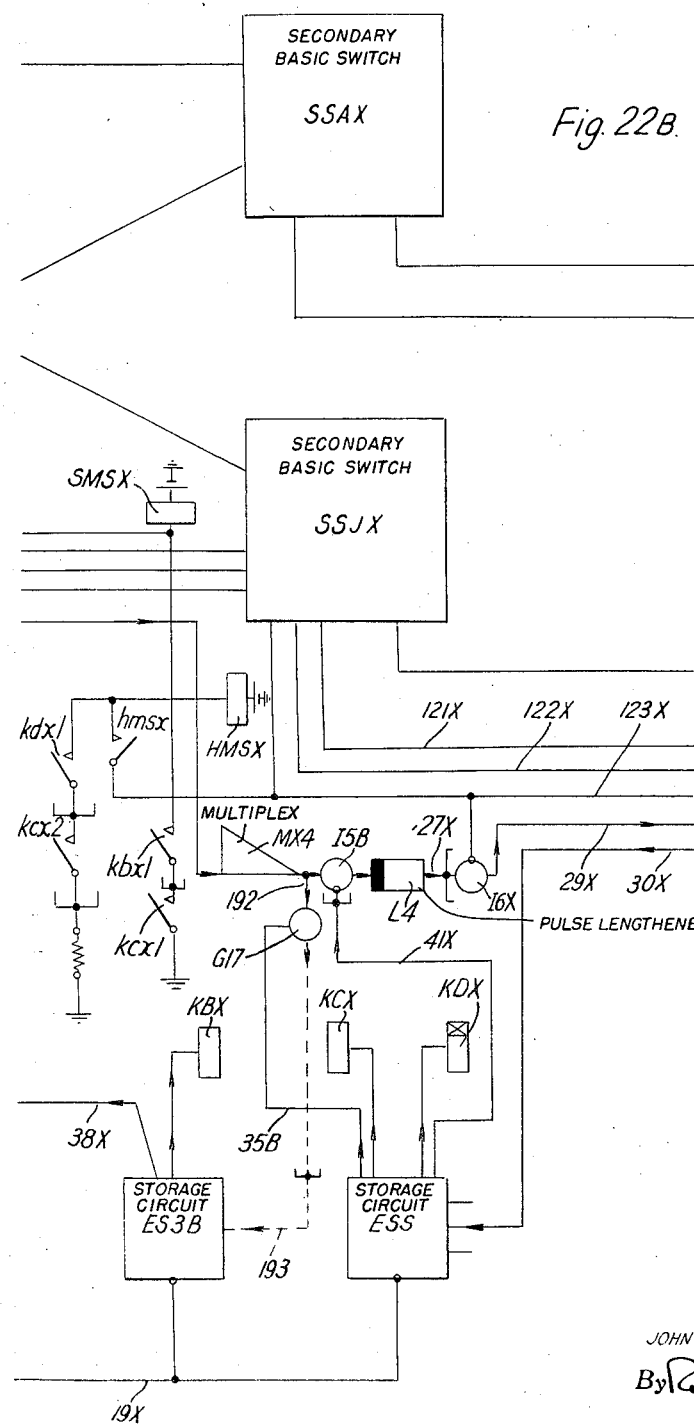
Figure 23A:
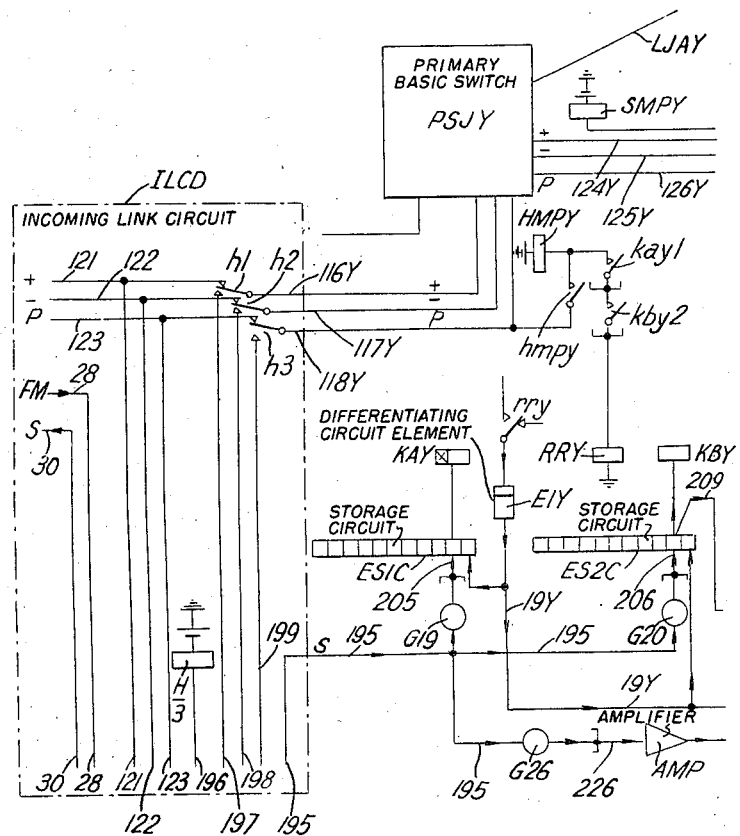
Figure 23B:
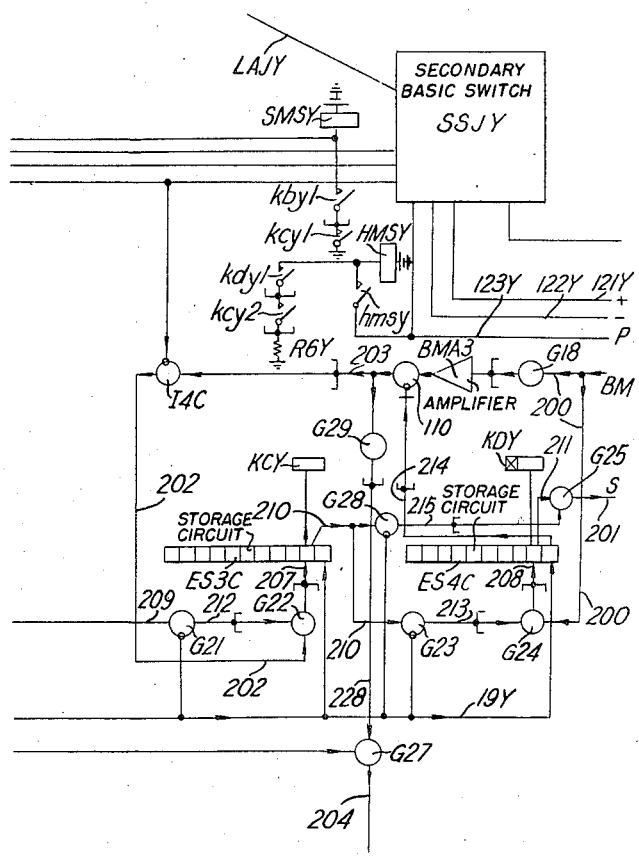
Figure 25:
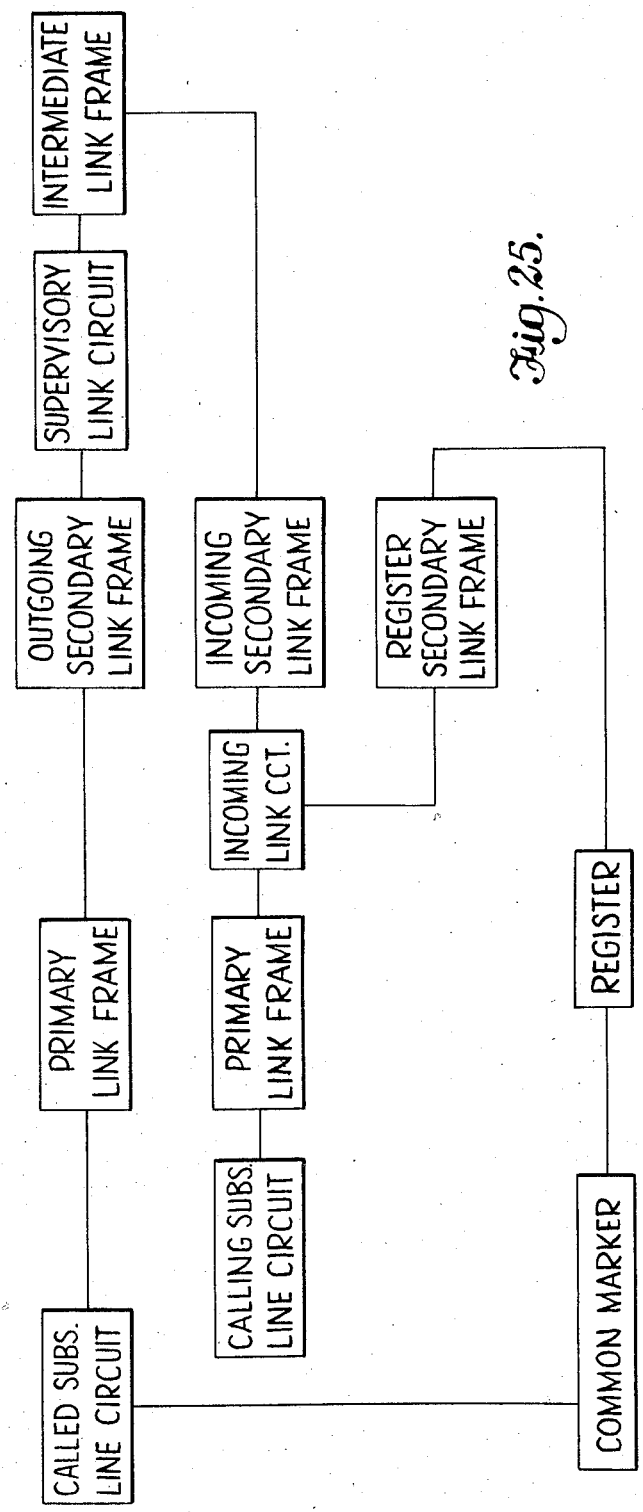

The features of the invention are exemplified in the specific selecting and related arrangements for a large (e.g. 10,000-line) automatic telephone exchange which will now be described with reference to the accompanying drawings. Fig. 1 of the drawings illustrates the arrangement of the links between the primary basic switches and the secondary basic switches of a link frame. Fig. 2 shows a schematic trunking diagram of the selecting and related arrangements concerned. Figs. 3A and 3B together constitute a circuit diagram showing the line circuit of a line connected to the exchange and a schematic circuit diagram of a primary link frame and its control circuit. Figs. 4 to 19 inclusive show the forms which various elements of the arrangements shown in Figs. 3A and 3B may take. Figs. 20A and 20B together constitute a schematic circuit diagram of an intermediate link frame and its control circuit. Fig. 21 shows the form which various elements of the arrangements shown in Fig. 20A may together take. Figs. 22A and 22B together constitute a schematic circuit diagram of an intermediate link frame and its control circuit, the control circuit being of an alternative form. Figs. 23A and 23B together constitute a circuit diagram showing an incoming link circuit and also showing a schematic circuit diagram of an incoming secondary link frame and its control circuit. Fig. 24 shows the form which various elements of the arrangements shown in Figs. 23A and 23B may together take. Fig. 25 is a simplified block diagram showing the apparatus involved in the setting up of a call between two lines connected to the exchange.

The selecting and related arrangements concerned include primary link frames, incoming secondary link frames, outgoing secondary link frames, register secondary link frames, and intermediate link frames. In general, each link frame comprises ten primary basic switches linked to ten secondary basic switches. Each basic switch is a cross-bar switch constituted either by a unit cross-bar switch having ten horizontal levels and ten or twenty vertical units, or by a plurality of such unit cross-bar switches.

The unit cross-bar switches employed are of a known type, and their construction does not form part of the present invention. Each comprises a framework on which are mounted ten or twenty vertical units and five horizontal select bars, each select bar having two select magnets individually associated with it. The energisation of one of the select magnets associated with a select bar rotates the bar in one direction, and the energisation of the other of these magnets rotates the bar in the other direction. Each vertical unit has an individual hold magnet and ten contact sets arranged in a vertical row. Each such contact set consists of three make contacts except in the case of the unit switches used in building up the register secondary link frames, where each such contact set consists of four make contacts. The fixed contact spring of each make contact is connected to the corresponding fixed contact springs of the other contact sets of the same vertical unit, so that what is in effect a vertical multiple is formed. The moving contact spring of each make contact is connected to the corresponding moving contact springs of the contact sets at the same level in the other vertical units of the same unit switch, so that what is in effect a horizontal multiple is formed. If firstly a select magnet of a unit switch is energised and then a hold magnet of the switch is energised, the select magnet remaining energised, the contact set at the relevant "crosspoint" is operated and thereafter remains operated, independently of the select magnet, for as long as the hold magnet is energised. The energisation of a select magnet of a unit switch for a period commencing within the period for which a hold magnet of the switch is energised has no effect upon the contact sets of the vertical unit to which this hold magnet belongs. Each vertical unit includes a hold magnet contact controlled by the hold magnet of the unit and having the form of a simple make contact which is closed during periods in which the hold magnet is energised.

Except in the case of the register secondary link frames, the two or more unit cross-bar switches of a basic switch constituted by a plurality of such unit switches are associated by multipling together corresponding horizontal levels and by connecting corresponding select magnets in parallel, with the result that a basic switch having more vertical units than a unit switch is formed.

Each register secondary link frame has to provide eight through wires in respect of each call set up over it, and for this reason each basic switch of such a frame is constituted by one or more pairs of unit cross-bar switches, the two unit switches of a pair being associated by connecting corresponding select magnets in parallel and by connecting corresponding hold magnets in parallel. By constituting the basic switches of a register secondary link frame in this way, the result is achieved that, when such a basic switch is set in respect of a call, two contact sets (each consisting of four make contacts) are operated to provide the requisite eight through wires. It follows, of course, that in the case of a basic switch of a register secondary link frame each of the ten levels of the switch is constituted by a pair of unit switch levels.

The terminal trunks of a primary basic switch are connected to the vertical units of the switch and constitute primary-side terminal trunks of the link frame concerned. The terminal trunks of a secondary basic switch are connected to the vertical units of the switch and constitute secondary-side terminal trunks of the link frame concerned. Each link frame has a control circuit individual to it.

Referring now to Fig. 1, this illustrates diagrammatically the arrangement of the links between the primary basic switches and the secondary basic switches of a link frame. To simplify the figure, only six basic switches and a small number of links are represented. Three unit cross-bar switches constituting primary basic switches are represented at PS1, PS2, and PS10, and three unit cross-bar switches constituting secondary basic switches are represented at SS1, SS2, and SS10. Each unit switch is represented as having ten horizontal levels HL, and as having ten vertical units VU connected to ten terminal trunks TT. When required, basic switches having more than ten terminal trunks are formed by adding further unit switches, as represented (by way of example) in broken lines at PS1a, PS2a, and PS10a, the corresponding horizontal levels of associated unit switches such as PS1 and PS1a being multipled together and the corresponding select magnets being connected in parallel. The basic switches PS1, PS2, and PS10 are the first, second, and tenth primary basic switches respectively of the link frame, and the basic switches SS1, SS2, and SS10 are respectively the first, second, and tenth secondary basic switches. Calling the top level of each basic switch the first level, and the second level from the top the second level, and so on, the horizontal levels of the primary basic switches of the link frame are so connected to the horizontal levels of the secondary basic switches by links LK that, in the generalised case, the "r"th one of the ten horizontal levels of the "m"th one of the ten primary basic switches is linked to the "m"th one of the ten horizontal levels of the "r"th one of the ten secondary basic switches. Thus, for example, as will be clear from the figure, the second of the ten horizontal levels of the first of the ten primary basic switches is linked to the first of the ten horizontal levels of the second of the ten secondary basic switches, and the second of the ten horizontal levels of the tenth of the ten primary basic switches is linked to the tenth of the ten horizontal levels of the second of the ten secondary basic switches.

Referring now to Fig. 2, this shows a schematic trunking diagram of the selecting and related arrangements concerned. In this diagram, PF represents any primary link frame, ISF represents any incoming secondary link frame, OSF represents any outgoing secondary link frame, RSF represents any register secondary link frame, and IF represents any intermediate link frame. Primary-side terminal trunks of these link frames are represented at 101, 103, 105, 107, and 109 respectively, whilst 102, 104, 106, 108, and 110 represent secondary-side terminal trunks associated with the respective link frames. The representations of the link frames are such that only one primary basic switch, one link, and one secondary basic switch are represented in the case of each link frame. The represented basic switches of the register secondary link frame RSF are shown as being made up of paired switches, in accordance with the arrangement for providing eight through wires per call which has already been explained. In addition to the link frames, the selecting and related arrangements concerned also include line circuits, incoming link circuits, and supervisory link circuits, and are for use in conjunction with a plurality of registers and a single common marker. The constitution and organisation of the supervisory link circuits and of the registers and of the common marker and of an allotter common to all the registers may be on known lines and do not form part of the present invention. In the trunking diagram, LC represents any line circuit, and ILC represents any incoming link circuit. To make the diagram complete and facilitate description, representations of a supervisory link circuit and of a register and of the common marker are included, SLC representing any supervisory link circuit and RG representing any register and MK representing the common marker. The terminal trunks 101 of a primary basic switch of a primary link frame PF are connected to the line circuits LC constituting a group of line circuits. A terminal trunk 102 of a secondary basic switch of a primary link frame PF is connected by an inter-stage trunk 111 to a terminal trunk 105 of a primary basic switch of an outgoing secondary link frame OSF, and is also connected to the inlet of an incoming link circuit ILC which includes a switching relay (represented in the figure by a single changeover contact).

An incoming link circuit ILC serves to link the terminal trunk 102 of a secondary basic switch of a primary link frame PF to a terminal trunk 107 of a primary basic switch of a register secondary link frame RSF and, over back contacts of the switching relay, to a terminal trunk 103 of a primary basic switch of an incoming secondary link frame ISF. During periods in which the switching relay is operated, the last-mentioned terminal trunk, instead of being linked to the relevant primary link frame terminal trunk 102, is linked to the relevant register secondary link frame terminal trunk 107. A terminal trunk 104 of a secondary basic switch of an incoming secondary link frame ISF is connected by an inter-stage trunk 112 to a terminal trunk 110 of a secondary basic switch of an intermediate link frame IF. A terminal trunk 109 of a primary basic switch of an intermediate link frame IF is connected to the inlet of a supervisory link circuit SLC to the outlet of which is connected to a terminal trunk 106 of a secondary basic switch of an outgoing secondary link frame OSF. This supervisory link circuit serves to control and supervise a call set up over the relevant outgoing secondary link frame terminal trunk 106, and includes apparatus for this purpose. A terminal trunk 108 of a secondary basic switch of a register secondary link frame is connected to a register RG. All the registers RG are served by the single common marker MK.

Still referring to Fig. 2, the general operation of the selecting arrangements as regards the setting up of a call between two lines connected to the exchange is as follows. The assumption of the calling condition by a line causes a forward-marking condition to exist on a forward-marking wire of the primary link frame primary-side terminal trunk 101 pertaining to the line. As a consequence of this, in the primary link frame PF concerned and its control circuit a forward-marking condition (not necessarily the same as the last-mentioned condition) is caused to exist on a forward-marking wire of each free link connected to the relevant primary basic switch, and is extended to a forward-marking wire of each free terminal trunk 102 of each secondary basic switch having such a free link connected to it. In the incoming link circuit ILC individual to each primary link frame secondary-side terminal trunk 102 affected, the forward-marking condition is extended through to a forward-marking wire of the register secondary link frame primary-side terminal trunk 107 associated with this link circuit. In each register secondary link frame RSF affected and its control circuit, the forward-marking condition is extended to a forward-marking wire of each free link connected to the relevant primary basic switch or switches, and thence to a forward marking wire of each free terminal trunk 108 of each secondary basic switch having such a free link connected to it. The result of this forward-marking process is that the forward-marking condition is extended to every free register RG having access to the line circuit LC of the calling line. The allotter previously referred to as being common to all the registers operates to the end that only one register RG responds to the receipt of a forward-marking condition at a time. The register RG which responds applies a setting-initiating condition to an incoming setting wire of the register secondary link frame secondary-side terminal trunk 108 individual to this register. Provision is made to ensure that this application of a setting-initiating condition only takes place whilst the marker MK is not in use, and that the marker cannot be taken into use during the period in which the condition is producing requisite settings of electronic equipment. In the register secondary link frame RSF concerned and its control circuit, this application of a setting-initiating condition causes electronic equipment in the control circuit to record the identity of the secondary-side terminal trunk 108 concerned, to effect the selection of and record the identity of a forward-marked link connected to the secondary basic switch concerned, to effect the selection of and record the identity of a forward-marked terminal trunk 107 of the primary basic switch to which this forward-marked link is connected, and to effect the extension of the setting-initiating condition to an incoming setting wire of this terminal trunk 107. In the incoming link circuit ILC to which the last-mentioned terminal trunk is connected, the setting-initiating condition is extended to a setting wire of the forward-marked primary link frame secondary-side terminal trunk 102 associated with this incoming link circuit. In the primary link frame PF concerned and its control circuit, this extension of the setting-initiating condition causes electronic equipment in the control circuit to record the identity of the secondary-side terminal trunk 102 concerned, to effect the selection of and record the identity of a forward-marked link connected to the secondary basic switch concerned, and to effect the selection of and record the identity of a forward-marked terminal trunk 101 of the primary basic switch to which this forward-marked link is connected. In each of the two link frame control circuits affected as just described by the reversion of a setting-initiating condition by a register RG over an incoming setting wire, the electronic equipment upon being set to record the identities of two terminal trunks and a link brings about the energisation of the relevant select and hold magnets for setting the relevant secondary basic switch and the relevant primary basic switch to complete a through connection between these terminal trunks over this link. In this manner the calling loop is extended to the register RG allotted to the call. This register thereupon operates the switching relay in the incoming link circuit ILC concerned by applying a relay-operating condition to a link-control wire included in the register secondary link frame secondary-side terminal trunk 108 concerned, reverts dialling tone to the calling line over the line wires incoming to it and included in the said terminal trunk 108, and applies an engaging earth to the private wire incoming to it and included in the same terminal trunk 108. This private wire is a through one extended to the line circuit LC of the calling line. Upon such application of an engaging earth, the link frame control circuits which have been taken into use for the call become free for attending to other calls. Upon receiving the dialled digits signifying the called line, the register RG concerned acquires the use of the marker MK as soon as it becomes available and transfers to it the necessary information, whereupon the marker causes a backward-marking condition to exist on a backward-marking wire of the primary link frame primary-side terminal trunk 101 pertaining to the called line. As a consequence of this, in the primary link frame PF concerned and its control circuit a backward-marking condition (not necessarily the same as the last-mentioned condition) is caused to exist on a backward-marking wire of each free link connected to the relevant primary basic switch, and hence on a backward-marking wire of each free terminal trunk 102 of each secondary basic switch having such a free link connected to it. As regards each primary link frame secondary-side terminal trunk 102 affected, the backward-marking condition is extended over the relevant interstage trunk 111 to a backward-marking wire of the outgoing secondary link frame primary-side terminal trunk 105 associated with this primary link frame secondary-side terminal trunk. In each outgoing secondary link frame OSF affected and its control circuit, the backward-marking condition is extended to a backward-marking wire of each free link connected to the relevant primary basic switch or switches, and thence to a backward-marking wire of each free terminal trunk 106 of each secondary basic switch having such a free link connected to it. In the supervisory link circuit SLC individual to each outgoing secondary link frame secondary-side terminal trunk 106 affected, the backward-marking condition is extended through to a backward-marking wire of the intermediate link frame primary-side terminal trunk 109 associated with this link circuit. In each intermediate link frame IF affected and its control circuit, the backward-marking condition is extended to a backward-marking wire of each free link connected to the relevant primary basic switch or switches, and thence to a backward-marking wire of each free terminal trunk 110 of each secondary basic switch having such a free link connected to it. As regards each intermediate link frame secondary-side terminal trunk 110 affected, the backward-marking condition is extended over the relevant inter-stage trunk 112 to a backward-marking wire of the incoming secondary link frame secondary-side terminal trunk 104 associated with this intermediate link frame secondary-side terminal trunk. In each incoming secondary link frame ISF affected and its control circuit, the backward-marking condition is extended to a backward-marking wire of each free link connected to the relevant secondary basic switch or switches. The result of this backward-marking process is that the backward-marking condition is extended to every free incoming secondary link frame link having access to the called line. At the same time as the marker MK applies the backward-marking condition in respect to the call, the register RG allotted to the call applies a setting-initiating condition to an outgoing setting wire. This outgoing setting wire is extended, over the register secondary link frame RSF used on the call and through the incoming link circuit ILC used on the call, to a setting wire of the incoming secondary link frame primary-side terminal trunk 103 associated with this incoming link circuit. In the incoming secondary link frame ISF concerned and its control circuit, this extension of the setting-initiating condition causes electronic equipment in the control circuit to record the identity of the primary-side terminal trunk 103 concerned, to effect the selection of and record the identity of a backward-marked link connected to the primary basic switch concerned, to effect the selection of and record the identity of a backward-marked terminal trunk 104 of the secondary basic switch to which this backward-marked link is connected, and to effect the extension of the setting-initiating condition to a setting wire of this terminal trunk 104 and hence to a setting wire of an intermediate link frame secondary-side terminal trunk 110. In the intermediate link frame IF concerned and its control circuit, this extension of the setting-initiating condition causes electronic equipment in the control circuit to record the identity of the secondary-side terminal trunk 110 concerned, to effect the selection of and record the identity of a backward-marked link connected to the secondary basic switch concerned, to effect the selection of and record the identity of a backward-marked terminal trunk 109 of the primary basic switch to which this backward-marked link is connected, and to effect the extension of the setting-initiating condition to a setting wire of this terminal trunk 109 and hence, through the relevant supervisory link circuit SLC, to a setting wire of an outgoing secondary link frame secondary-side terminal trunk 106. In the same general manner this recording and selecting process proceeds until the extension of the setting-initiating condition causes electronic equipment in the control circuit of the primary link frame PF to which the line circuit LC of the called line is connected to effect the selection of and record the identity of the backward-marked primary-side terminal trunk 101 connected to this line circuit. In each of the four link frame control circuits affected as just described as a result of the application of a setting-initiating condition to an outgoing setting wire by the register RG concerned, the electronic equipment upon being set to record the identities of two termial trunks and a link produces a control-set condition on a control-set wire which is extended to the marker MK, and brings about the energisation of the relevant select and hold magnets for setting the relevant secondary basic switch and the relevant primary basic switch to complete a through connection between these terminal trunks over this link. As soon as the marker MK has received a control-set condition on the control-set wire for each link frame concerned, it is released and becomes free to attend to other calls. When an outgoing pair of line wires of the register RG concerned become connected through over the relevant register secondary, incoming secondary, and intermediate link frames to the supervisory link circuit SLC concerned, this link circuit applies a holding earth to the private wire incoming to it and to the private wire outgoing from it, with the consequence that each link frame control circuit concerned is free for use on other calls as soon as it has performed its setting function and the relevant private wire has been extended to the relevant terminal trunk of the link frame. The called line is rung from the supervisory link circuit SLC, which reverts ringing tone towards the register RG. The register RG responds to the receipt of ringing tone by releasing itself from the connection and releasing the switching relay of the incoming link circuit ILC used on the call. The line wires extended to the calling line thereupon become connected through in this incoming link circuit to the line wires of the relevant incoming secondary link frame primary-side terminal trunk 103 and thence to the incoming side of the supervisory link circuit SLC. Further control and supervision of the call is thereafter vested in the supervisory link circuit.

In the case of a call to a P.B.X group of lines or a group of junctions, the marker MK, instead of applying a backward-marking condition to a backward-marking wire associated with one line as just described, applies a backward-marking condition to the relevant backward-marking wires associated with all the lines of the group.

Referring now to Figs. 3A and 3B, these when placed side by side with Fig. 3B to the right of Fig. 3A together constitute a circuit diagram showing the line circuit LC (Fig. 2) of a line connected to the exchange and a schematic circuit diagram of a primary link frame PF (Fig. 2) and its control circuit, this schematic circuit diagram being of the so-called functional type.

The line circuit is that part of Fig. 3A which is included in the chain-line rectangle LCD, and has through positive and negative line wires. The positive line wire 113 of the line circuit is directly connected on the exchange side (the right-hand side as shown) to the positive line wire 116 of the primary link frame primary-side terminal trunk pertaining to the line, and is connected to earth over a first line resistor R1 and to a forward-marking or "FM" wire 119 over a first control resistor R3. The negative line wire 114 of the line circuit is directly connected on the exchange side to the negative line wire 117 of the primary link frame primary-side terminal trunk and is connected to negative battery (50 volts negative) over a second line resistor R2. On the line side (the left-hand side as shown), the positive line wire 113 and the negative line wire 114 are of course connected to the corresponding line wires of the line concerned. The line circuit has a private or "P" wire 115 which is directly connected to the private wire 118 of the primary link frame primary-side terminal trunk, and which is connected to earth over a control rectifier MR1 and a meter M in series, the rectifier being a dry-plate one connected to permit operation of the meter in response to a negative battery condition on the private wire. In addition to these connections, the private wire 115 is directly connected to a busy-marking wire 120, and is connected to positive battery (50 volts positive) over the primary winding (I) of an impulse-generating transformer TRA and a second control resistor R4 in series and to a source of "class of service" tone over a third control resistor R5, terminal CS being cross-connected to an appropriate source. The forward-marking wire 119 is directly connected to a forward-marking wire 1 of the primary link frame primary-side terminal trunk, and is connected to the cathode of a cold-cathode gas-filled diode V1 through the secondary winding (II) of the impulse-generating transformer TRA. The anode of this diode is connected to positive battery. The busy-marking wire 120 is directly connected to a busy-marking wire 2 of the primary link frame primary-side terminal trunk. When the line assumes the calling condition, the resulting current through the two line resistors R1 and R2 and the calling loop produces a voltage drop across the first line resistor R1 and thereby causes a negative voltage forward-marking condition (10 or more volts negative) to exist on the forward-marking wire 119. When, as the result of this forward-marking condition, the line and private wires 113, 114, and 115 become connected through to a register, the register if necessary records the information given by the "class of service" tone extended to it over the through private wire and then applies a holding and busy-marking condition to this wire by earthing it. The busy-marking condition is extended to the busy-marking wire 120 and thence to the busy-marking wire 2, and thereby renders the forward-marking condition on the forward-marking wire 119 ineffective. Subsequent to the disconnection of the register, the holding and busy-marking condition is maintained on the through private wire for the duration of the call by the supervisory link circuit used on the call. When the line is the called line of a connection, a forward-marking condition is caused to exist on the forward-marking wire 119 as soon as the line is looped in respect of the call, but is rendered ineffective in this case also by a busy-marking condition extended to the busy-marking wire 120. In the case where, after the line assumes the calling condition, dialling is unduly delayed after the reversion of dialling tone from the register taken into use, the register after measuring off a delay period removes the earth holding and busy-marking condition from the through private wire. In response to the fall of current through its primary winding (I) which results from such removal of earth from the through private wire, the impulse-generating transformer TRA produces in its secondary winding (II) a voltage impulse which serves to strike the cold-cathode gas-filled diode V1. When thus started, the discharge through the diode V1 is sustained until the calling loop is opened, and gives a visible indication of the permanent loop condition of the line and serves to change the potential of the forward-marking wire 119 so that the forward-marking condition no longer exists on this wire. In this way, a permanent loop condition is prevented from holding vertical units and links and a register out of use. In the case where the line is the calling line of a call and the called line clears first and clearing by the calling line is unduly delayed, the supervisory link circuit used on the call removes the earth holding and busy-marking condition from the through private wire after a delay period, causing the cold-cathode gas-filled diode V1 to strike with the results just set forth.

Still referring to Figs. 3A and 3B, only typical elements of the primary link frame concerned and its control circuit are represented in the schematic circuit diagram constituted by these figures. Two primary basic switches are represented at PSA and PSJ, and two secondary basic switches are represented at SSA and SSJ. Terminal trunks of these switches are represented at TPA, TPJ, TSA, and TSJ. A link between a horizontal level of the basic switch PSA and a horizontal level of the basic switch SSA is represented at LAA, a link between a horizontal level of the basic switch PSA and a horizontal level of the basic switch SSJ is represented at LAJ, and a link between a horizontal level of the basic switch PSJ and a horizontal level of the basic switch SSA is represented at LJA. All six wires 1, 2, 43, 116, 117, and 118 of one typical primary-side terminal trunk, all six wires 28, 29, 30, 121, 122, and 123 of one typical secondary-side terminal trunk and all five wires 124, 125, 126, 39, and 40 of one typical link are shown. Each terminal trunk and each link includes a positive line wire (116, 121, 124), a negative line wire (117, 122, 125), a private or "P" wire (118, 123, 126), a forward-marking or "FM" wire (1, 28, 39), and a backward-marking or "BM" wire (43, 29, 40). Each primary-side terminal trunk also includes a busy-marking wire 2, and each secondary-side terminal trunk also includes a setting or "S" wire 30. Each primary basic switch has individual to it a forward-marking or "FM" wire 15 and a backward-marking or "BM" wire 16. Each secondary basic switch has individual to it a forward-marking or "FM" wire 26 and a backward-marking or "BM" wire 27. Each link has individual to it a forward-marking gate I1 which controls the extension of a forward-marking condition from the forward-marking wire 15 of the relevant primary basic switch to the forward-marking wire 39 of the link, and has individual to it a backward-marking gate I4 which controls the extension of a backward-marking condition from the backward-marking wire 16 of this basic switch to the backward-marking wire 40 of the link. Each secondary basic switch has individual to it a forward-marking gate I2 which controls the extension of a forward-marking condition, from the forward-marking wire 39 of any of the links connected to the switch, to the forward-marking wire 26 of the switch. Each of the forward-marking wires 39 concerned is linked to the gate I2 by an isolating gate G5 and an amplifier FMA, there being a gate G5 for each of these wires and the amplifier FMA being common to all of them. Each secondary basic switch also has individual to it a backward-marking gate I5 which controls the extension of a backward-marking condition, from the backward-marking wire 40 of any of the links connected to the switch, to the backward-marking wire 27 of the switch. Each of the backward-marking wires 40 concerned is linked to the gate I5 by an isolating gate G6 and an amplifier BMA, there being a gate G6 for each of these wires and the amplifier BMA being common to all of them. Each secondary-side terminal trunk has individual to it a forward-marking gate I3 which controls the extension of a forward-marking condition from the forward-marking wire 26 of the relevant secondary basic switch to the forward-marking wire 28 of the trunk, and has individual to it a backward-marking gate I6 which controls the extension of a backward-marking condition from the backward-marking wire 27 of this basic switch to the backward-marking wire 29 of the trunk. The control circuit of the primary link frame includes a time-division-multiplex system. Each primary basic switch has individual to it a forward-marking multiplex MX1, a backward-marking multiplex MX2, and a busy-marking multiplex MX3. Each of these multiplexes has an input wire for each terminal trunk of the primary basic switch concerned. Each has an output pulse highway, and serves to produce on this highway, in response to the presence of the relevant condition on an input wire (forward-marking, backward-marking, or busy-marking, as the case may be), the pulse train pertaining to the channel allocated to the terminal trunk to which this input wire corresponds. The input wires, corresponding to a primary-side terminal trunk, of the forward-marking multiplex MX1, backward-marking multiplex MX2, and busy-marking multiplex MX3 of the primary basic switch to which the trunk is connected, are respectively constituted by the forward-marking wire 1, backward-marking wire 43, and busy-marking wire 2 of the trunk. The output pulse highway 3 of a forward-marking multiplex MX1 is connected to a main forward-marking pulse highway 12, individual to the primary basic switch concerned, over a forward-marking gate I7 which is arranged to block the extension over it to the last-mentioned highway of the pulse train pertaining to any channel, and primary-side terminal trunk, in respect of which the busy-marking multiplex MX3 of this switch is producing the corresponding pulse train on its output pulse highway 4, and to block the extension over it of any pulse trains whatever during periods in which pulses exist on a main backward-marking pulse highway 9 of this switch. The output pulse highway 7 of a backward-marking multiplex MX2 is connected to a main backward-marking pulse highway 9, individual to the primary basic switch concerned, over a backward-marking gate I8 which is arranged to block the extension over it to the last-mentioned highway of the pulse train pertaining to any channel, and primary-side terminal trunk, in respect of which the busy-marking multiplex MX3 of this switch is producing the corresponding pulse train or in respect of which the forward-marking multiplex MX1 of this switch is producing the corresponding pulse train. The main forward-marking pulse highway 12 and the main backward-marking pulse highway 9 of a primary basic switch are linked by an isolating gate G7 to a main combined-marking pulse highway 11 which is individual to this switch and is connected over a pulse-selection gate G2, also individual to this switch, to a selection pulse highway 18 common to all the primary basic switches of the link frame. The main forward-marking pulse highway 12 of a primary basic switch has associated with it a forward-marking pulse lengthener L1 having an output wire which constitutes the forward-marking or "FM" wire 15 previously referred to. The pulse lengthener L1 serves to produce a forward-marking condition on the wire 15 whenever pulses exist on the pulse highway 12. The main backward-marking pulse highway 9 of a primary basic switch has associated with it a backward-marking pulse lengthener L2 having an output wire which constitutes the backward-marking or "BM" wire 16 previously referred to. The wire 16 is directly connected to a control wire 23 which is connected to the marker. The pulse lengthener L2 serves to produce a backward-marking condition on the wire 16 whenever pulses exist on the pulse highway 9. The output pulse highway 7 of a backward-marking multiplex MX2 has associated with it a signalling pulse lengthener L3 having an output wire 45 which is connected to the marker. The pulse lengthener L3 serves to produce a number-obtainable condition on the wire 45 whenever pulses exist on the pulse highway 7. The control circuit of the primary link frame includes four electronic storage circuits, namely a first electronic storage circuit ES1 which serves to record which particular column of vertical units of secondary basic switches is concerned when a setting-initiating condition is received over a secondary-side terminal trunk of the link frame, a second electronic storage circuit ES2 which serves to record which particular secondary basic switch is concerned when a setting-initiating condition is so received, a third electronic storage circuit ES3 which serves to choose and record which particular primary basic switch is to be used when a setting-initiating condition is so received, and a fourth electronic storage circuit ES4 which serves to choose and record which particular column of vertical units of primary basic switches is concerned when a setting-initiating condition is so received. For each column of vertical units with which it is concerned, the first electronic storage circuit ES1 comprises an input wire 31 and a cold-cathode gas-filled valve which is connected to control a slow-operating electromagnetic relay KD corresponding to the column. The appearance of a setting-initiating condition (earth) on the setting or "S" wire 30 of a secondary-side terminal trunk of the link frame causes a setting-initiating condition to be applied to the relevant input wire 31 by way of an isolating gate G8 individual to the trunk, with the result, provided that the storage circuit ES1 is at normal, that the relevant cold-cathode valve of this storage circuit is fired and initiates the operation of the relay KD corresponding to the column of vertical units concerned. During periods in which the first electronic storage circuit ES1 is off normal, it produces an inhibiting condition on a control wire 41, thereby causing the forward-marking gates I2 and the backward-marking gates 15 of all the secondary basic switches of the link frame to block the extension of a marking condition to the forward-marking wires 26 and the backward-marking wires 27 of these switches. For each of the ten secondary basic switches of the link frame, the second electronic storage circuit ES2 comprises an input wire 33 and a cold-cathode gas-filled valve which is connected to control an electromagnetic relay KC corresponding to the secondary basic switch. The appearance of a setting-initiating condition (earth) on the setting wire 30 of a secondary-side terminal trunk of the link frame causes a setting-initiating condition to be applied to the relevant input wire 33 by way of an isolating gate G9 individual to the trunk with the result, provided that the storage circuit ES2 is at normal, that the relevant cold-cathode valve of this storage circuit is fired and initiates the operation of the relay KC corresponding to the secondary basic switch concerned and causes a setting-initiating condition to be applied to a control wire 35 corresponding to this switch. For each of the ten primary basic switches of the link frame, the third electronic storage circuit ES3 comprises an input wire 37 and a cold-cathode gas-filled valve which is connected to control an electromagnetic relay KB corresponding to the primary basic switch. The application of a setting-initiating condition to a wire 35 causes a setting-initiating condition to be applied to each of the input wires 37 which corresponds to a primary basic switch having connected to it a free and marked link to the secondary basic switch to which this wire 35 corresponds, with the result, provided that the storage circuit ES3 is at normal, that the cold-cathode valve corresponding to one, and one only, of these particular input wires 37 is fired and initiates the operation of the corresponding relay KB and causes a setting-initiating condition to be applied to a control wire 38 corresponding to the primary basic switch concerned. The association between the wire 35 corresponding to a secondary basic switch and an input wire 37 of the storage circuit ES3 is by way of a gate G10 individual to the secondary basic switch, and a gate G1 individual to the link between this secondary basic switch and the primary basic switch to which the input wire 37 corresponds. There is a gate G1 for each link of the primary link frame. A forward-marking condition on the forward-marking wire 39 of a link is extended to a marking wire 36, individual to the link, over an isolating gate G4 individual to the link. A backward-marking condition on the backward-marking wire 40 of a link is extended to the wire 36 over an isolating gate G11 individual to the link. The gate G1 individual to a link is arranged so that the application of a setting-initiating condition to the associated wire 35 (with the consequent application of a setting-initiating condition to the associated wire 34) only causes a setting-initiating condition to be applied to the associated wire 37 if a marking exists on the wire 36 individual to the link. The fourth electronic storage circuit ES4 has an input circuit constituted by the selection pulse highway 18. For each column of vertical units with which it is concerned, this storage circuit comprises a cold-cathode gas-filled valve which is connected to control a slow-operating electromagnetic relay KA corresponding to the column. The application of a setting-initiating condition to a control wire 38 opens the pulse-selection gate G2 of the primary basic switch to which this wire 38 corresponds, with the result, provided that the storage circuit ES4 is at normal, that the first pulse present on the main combined-marking pulse highway 11 of this switch subsequent to the opening of this gate brings about the firing of the cold-cathode valve corresponding to the column of vertical units concerned and initiates the operation of the relay KA corresponding to this column. The storage circuit ES4 has an output wire 21 on which a steady control-set condition is produced for as long as the storage circuit is off-normal, and which is connected, over a differentiating circuit element B1, to a primary link frame control-set wire 22. From what has been said, it will be clear that the appearance of a setting-initiating condition (earth) on the setting or "S" wire 30 of a secondary-side terminal trunk of the primary link frame fires a cold-cathode gas-filled valve in each of the four electronic storage circuits ES1, ES2, ES3, and ES4 and initiates the operation of four corresponding electromagnetic relays KD, KC, KB, and KA. Each link has two select magnets SMP and SMS associated with it, the select magnet SMP being the select magnet associated with the primary basic switch level to which the link is connected and the select magnet SMS being the select magnet associated with the secondary basic switch level to which the link is connected. The two select magnets SMP and SMS associated with a link have a common operating circuit comprising series-connected contacts (*kb*1 and *kc*1) of the relays KB and KC corresponding to the primary and secondary basic switches concerned. The contact *kc*1 of a relay KC is common to the operating circuits of the select magnets of all the links connected to the secondary basic switch to which this relay corresponds. The hold magnet HMP of a vertical unit of a primary basic switch controls a make contact *hmp*, and has an operating circuit including series-connected contacts (*ka*1 and *kb*2) of the relays KA and KB corresponding to the column of vertical units concerned and the primary basic switch and also including the winding of an electromagnetic restoring relay RR. The contact *kb*2 of a relay KB is common to the operating circuits of the hold magnets of all the vertical units of the primary basic switch to which this relay corresponds, and the winding of the relay RR is common to the operating circuits of the hold magnets of all the vertical units of all the primary basic switches of the link frame. The hold magnet HMS of a vertical unit of a secondary basic switch controls a make contact *hms*, and has an operating circuit including series-connected contacts (*kd*1 and *kc*2) of the relays KD and KC corresponding to the column of vertical units concerned and the secondary basic switch and also including a resistor R6. The contact *kc*2 of the relay KC is common to the operating circuits of the hold magnets of all the vertical units of the secondary basic switch to which this relay corresponds, and the resistor R6 is common to the operating circuits of the hold magnets of all the vertical units of all the secondary basic switches of the link frame. The restoring relay RR has a change-over contact *rr* which controls a circuit element E1 having an output wire 19 which constitutes a restoring wire common to the four storage circuits ES1, ES2, ES3, and ES4. The circuit element E1 serves to remove a positive high-tension potential from the wire 19 for a period upon the release of the relay RR, such removal serving to restore the four storage circuits to normal. Each primary basic switch has individual to it a signalling gate G3 which serves to produce a control-not-busy condition on a corresponding signal wire 44 during periods in which the condition obtains that a backward-marking condition exists on the wire 23 and a control-set condition does not exist on the wire 21. The signal wire 44 is connected to the marker.

Still referring to Figs. 3A and 3B, when the line associated with a primary link frame primary-side terminal trunk assumes the calling condition, thereby causing a negative voltage forward-marking condition (10 or more volts negative) to exist on the forward-marking wire 1 of the trunk, the forward-marking multiplex MX1 individual to the primary basic switch concerned produces on its output pulse highway 3 the pulse train pertaining to the trunk. This train is extended, assuming that no condition exists to cause the relevant forward-marking gate I7 to block the extension of the train, to the main forward-marking pulse highway 12 associated with the primary basic switch. The pulse train pertaining to the trunk consequently appears on the main combined-marking pulse highway 11 associated with this switch, and the forward-marking pulse lengthener L1 connected to the pulse highway 12 produces a positive voltage forward-marking condition (50 volts positive) on its output wire 15. It may already be doing so as a consequence of one or more other pulse trains on the pulse highway 12. The positive voltage forward-marking condition is extended to the forward-marking wire 39 of each free link connected to the relevant primary basic switch, the extension of this condition to an engaged link being blocked by the relevant forward-marking gate I1. As regards each link to which a forward-marking is thus extended, the positive voltage forward-marking condition is further extended (assuming that the first electronic storage circuit ES1 is at normal) through the relevant isolating gate G5 and wire 24 and amplifier FMA and forward-marking gates I2 and I3, to the forward-marking wire 28 of each free terminal trunk of the secondary basic switch to which the link is connected. The amplifier FMA serves to make good any reduction of marking potential due to the shunting effect of link forward-marking gates I1 and link isolating gates G5. When, as a consequence of the extension of the forward-marking condition, a setting-initiating condition (earth) appears on the setting or "S" wire 30 of a forward-marked secondary-side terminal trunk of the link frame, each of the four electronic storage circuits ES1, ES2, ES3, and ES4 is set, and initiates the operation of an appropriate electromagnetic relay, as will be clear from the description already given. In the case now being considered (that is, the operation of a primary link frame on an outgoing call) the marker is not involved, and the only useful effect of the production of the steady control-set condition on the output wire 21 of the storage circuit ES4 is to prevent the production of a control-not-busy condition on the signal wire 44. The settings of the two storage circuits ES1 and ES2 together constitute a record of the identity of the particular secondary-side terminal trunk concerned. The settings of the two storage circuits ES2 and ES3 together constitute a record of the identity of the particular forward-marked link appropriated by the electronic storage equipment. The settings of the two storage circuits ES3 and ES4 together constitute a record of the identity of the particular forward-marked primary-side terminal trunk appropriated. Of the four electromagnetic relays concerned, the two relays KC and KB associated with the second and third storage circuits ES2 and ES3 operate first, and complete the series circuit, containing a make contact (*kc1*) of the relay KC and a make contact (*kb1*) of the relay KB, for operating the select magnets SMP and SMS associated with the forward-marked link concerned. Upon the operation of the relay KD associated with the first storage circuit ES1, the hold magnet HMS associated with the secondary-side terminal trunk concerned is operated in the series circuit containing a make contact (*kd1*) of this relay, a make contact (*kc2*) of the relay KC associated with the second storage circuit ES2, and the resistor R6. This hold magnet on operation operates the contact set at the relevant "crosspoint" of the secondary basic switch concerned. It also closes the contact *hms* which it controls, thereby connecting its battery-connected winding to the private wire 123 of the secondary-side terminal trunk concerned. Upon the operation of the relay KA associated with the fourth storage circuit ES4, a series circuit for operating the restoring relay RR, and for operating the hold magnet HMP associated with the primary-side terminal trunk concerned, is closed over a make contact (*ka1*) of the operated relay KA and a make contact (*kb2*) of the operated relay KB associated with the third storage circuit ES3. Relay RR operates before the hold magnet HMP. On operation, the hold magnet HMP operates the contact set at the relevant "crosspoint" of the primary basic switch concerned. It also closes its contact *hmp*, thereby connecting its battery-connected winding to the private wire 118 of the primary-side terminal trunk concerned. As soon as a holding earth is extended to the last-mentioned private wire 118, the restoring relay RR is released by being short-circuited, with the result that the circuit element E1 removes the positive high-tension potential from the restoring wire 19 for a period so that the four electronic storage circuits ES1, ES2, ES3, and ES4 are restored to normal. Upon the consequent release of the four relays KA, KB, KC, and KD, the two operated hold magnets are held, for as long as is requisite, by the holding earth on the through private wire. The earthing of the private wire 118 of the primary-side terminal trunk concerned causes an earth busy-marking condition to be applied to the input wire 2, corresponding to the trunk, of the relevant busy-marking multiplex MX3 of the link frame.

Still referring to Figs. 3A and 3B, when the line associated with a primary link frame primary-side terminal trunk is the called line of a call, and the marker applies a negative voltage backward-marking condition (50 volts negative) to the backward-marking wire 43 of the trunk, the backward-marking multiplex MX2 individual to the primary basic switch concerned produces on its output pulse highway 7 the pulse train pertaining to the trunk. In response to the presence of the pulses on the pulse highway 7, the signalling pulse lengthener L3 produces the number-obtainable condition on the wire 45 to signify to the marker that the number called is not a dead number. The pulse train is extended, assuming that no condition exists to cause the relevant backward-marking gate I8 to block the extension of the train, to the main backward-marking pulse highway 9 associated with the primary basic switch concerned. The pulse train pertaining to the trunk consequently appears on the main combined-marking pulse highway 11 associated with this switch, and the backward-marking pulse lengthener L2 connected to the pulse highway 9 produces a positive voltage backward-marking condition (50 volts positive) on its output wire 16. The positive voltage backward-marking condition is extended to the backward-marking wire 40 of each free link connected to the relevant primary basic switch, the extension of this condition to an engaged link being blocked by the relevant backward-marking gate I4. As regards each link to which a backward-marking is thus extended, the positive voltage backward-marking condition is further extended (assuming that the first electronic storage circuit ES1 is at normal) through the relevant isolating gate G6 and wire 25 and amplifier BMA and backward-marking gates I5 and I6, to the backward-marking wire 29 of each free terminal trunk of the secondary basic switch to which the link is connected. The amplifier BMA serves to make good any reduction of marking potential due to the shunting effect of link backward-marking gates I4 and link isolating gates G6. When, as a consequence of the extension of the backward-marking condition, a setting-initiating condition (earth) appears on the setting or "S" wire 30 of a backward-marked secondary-side terminal trunk of the link frame, the ensuing operations correspond to those previously described which take place when such appearance of a setting-initiating condition takes place as a consequence of the extension of a forward-marking condition. In this case, however, a control-set condition applied for a brief period to the primary link frame control-set wire 22 by the differentiating circuit element B1, in response to the appearance of the steady control-set condition on the wire 21, serves to intimate to the marker that, so far as the particular link frame is concerned, the function of the marker has been effected and the marker can be released to attend to other calls.

Referring now to Fig. 4, this shows the form which each of the multiplexes MX1 and MX3 in Fig. 3A may take. In this form of multiplex, for each input wire there is an input gate circuit comprising an input terminal 133, a pulse supply terminal 134, an input resistor R7, a pulse supply capacitor C1, and a gating rectifier MR2. The pulse supply terminal 134 of an input gate circuit is connected to a source of negative pulses which occupy the time positions pertaining to the relevant one of the plurality of channels of the multiplex. There is of course one channel per input wire. All the input gate circuits are associated with a common load resistor R8, one end of which is connected to a terminal 136. The multiplex also includes two amplifying valves V2 and V3, the valve V2 being a pentode and the valve V3 being a triode. The valve V2 has a load resistor R9, the valve V3 has a load resistor R10, and the two valves are coupled by two coupling resistors R11 and R12. An output terminal 135 is associated with the load resistor R10. In the case of the multiplex MX1 of Fig. 3A, the input terminals 133 are connected to the respective forward-marking wires 1, the terminal 136 is connected to 10 volts negative, and the output terminal 135 is connected to the output pulse highway 3. In the case of the multiplex MX3 of Fig. 3A, the input terminals 133 are connected to the respective busy-marking wires 2, the terminal 136 is connected to earth, and the output terminal 135 is connected to the output pulse highway 4. In either case, in the absence of the relevant marking condition (10 or more volts negative or earth) on the input terminal 133 of an input gate circuit this terminal is 10 or more volts positive with respect to the terminal 136, so that the gating rectifier MR2 of the gate circuit is biased so that it does not conduct in response to the negative pulses (which are of less than 10 volts amplitude) applied to the pulse supply terminal 134 of the gate circuit. When the relevant marking condition appears on the input terminal 133, the gating rectifier MR2 is no longer biased as just stated, with the result that pulses corresponding to those applied to the pulse supply terminal 134 appear across the resistor R8. The effect of this is that pulses pertaining to each channel (of the plurality of channels of the multiplex) in respect of which the relevant marking condition is applied appear across the resistor R8. These pulses are amplified by the two-stage amplifier constituted by the valves V2 and V3 and the load and coupling resistors R9, R10, R11, and R12, which produces corresponding positive pulses at the output terminal 135. The second stage of the amplifier is of the so-called cathode-follower type, enabling it to be readily arranged that this stage, considered as a source of pulses, constitutes a low impedance source, so that the effect of stray capacitance on the pulse shape is reduced.

Referring now to Fig. 5, this shows the form which the multiplex MX2 in Fig. 3A may take. This form is very similar to that of Fig. 4 except that the amplifier is only a single-stage one. For each input wire there is an input gate circuit comprising an input terminal 137, a pulse supply terminal 138, an input resistor R13, a pulse supply capacitor C2, and a gating rectifier MR3. The pulse supply terminal 138 of an input gate circuit is connected to a source of negative pulses which occupy the time positions pertaining to the relevant one of the plurality of channels of the multiplex. The multiplex includes a load resistor R14, an amplifying valve V4 (a pentode), a load resistor R15, and an output terminal 139. The input terminals 137 are connected to the respective backward-marking wires 43, and the output terminal 139 is connected to the output pulse highway 7. Normally, the backward-marking wire 43 connected to the input terminal 137 of an input gate circuit is at earth potential and the gating rectifier MR3 is biased so that it does not conduct in response to the negative pulses applied to the pulse supply terminal 138. When the marker applies the negative voltage backward-marking condition (50 volts negative) to the wire 43, the gating rectifier MR3 is no longer so biased, and negative pulses corresponding to those applied to the pulse supply terminal 138 appear across the common load resistor R14 associated with all the input gate circuits of the multiplex. These pulses are amplified by the amplifying valve V4, which produces corresponding positive pulses at its anode and hence at the ouput terminal 139.

Referring now to Fig. 6, this shows the form which the gate 17 in Fig. 3A may take. In this form of gate, there is an input gate circuit which is of the so-called coincidence type and which comprises an input terminal 143, a first input capacitor C6, a pulse supply terminal 144, a second input capacitor C7, control resistors R16 and R17 and R18, and gating rectifiers MR6 and MR7 and MR8. The pulse supply terminal 144 is connected to a source of positive reference pulses one of which occurs in each time position pertaining to each channel of the time-division-multiplex system concerned. These pulses, currently termed "clock" pulses, are narrower than the pulses produced by the multiplexes. The gate 17 also includes a triode V5 which serves as an output valve. This valve has a load resistor R19 connected in its cathode circuit, and has its cathode connected to an output terminal 145. Further, the gate 17 includes a double triode V6 which serves as an inhibiting valve. The grid of the left-hand section of the valve V6 is connected to a first inhibiting input circuit comprising an inhibiting input terminal 146, a capacitor C8, a rectifier MR9, and a resistor R20. The grid of the right-hand section of the valve V6 is connected to a second inhibiting input circuit comprising an inhibiting input terminal 147, and resistors R21 and R22. The input terminal 143 is connected to the output pulse highway 3 of the forward-marking multiplex MX1 with which the gate 17 is associated, and the output terminal 145 is connected to the relevant main forward-marking pulse highway 12. The inhibiting input terminal 146 is connected to the output pulse highway 4 of the relevant busy-marking multiplex MX3, and the inhibiting input terminal 147 is connected to the backward-marking wire 16 of the relevant primary basic switch. In the absence of both a positive pulse at the input terminal 143 and a positive clock pulse at the terminal 144, the gating rectifier MR8 is conducting with the result that the grid of the valve V5 is held at earth potential. If a positive pulse appears at one of the terminals 143 and 144 but not at the other, the gating rectifier MR8 remains conducting and the grid of the valve V5 continues to be held at earth potential. Provided that no inhibiting condition appears at one or both of the inhibiting input terminals 146 and 147 at the time, the appearance together of a positive pulse at the input terminal 143 and a positive clock pulse at the pulse supply terminal 144 gives rise to a condition in which the gating rectifier MR8 is biased so that it does not conduct and in which the potential of the grid of the valve V5 rises, with the result that a positive pulse is produced at the output terminal 145. When a positive pulse appears at the inhibiting input terminal 146, the resulting voltage across the resistor R20 causes the left-hand section of the valve V6, normally biased to the anode current cut-off condition, to take an anode current which exceeds the current in the control resistor R18 and thereby prevents the gating rectifier MR8 from being biased to the non-conducting condition. Thus a pulse appearing at the input terminal 143 at the same time as a pulse appears at the terminal 146 produces no corresponding pulse at the output terminal 145. Since the input gate circuit of the coincidence type can only produce a pulse coincident with a clock pulse, it follows that even if a pulse appearing at the input terminal 143 is slightly wider than a corresponding pulse applied to the terminal 146, no incorrect production of a pulse at the output terminal 145 results provided that the said corresponding pulse completely overlaps the pertinent clock pulse. The rectifier MR9 serves to provide a low-resistance discharging circuit for the capacitor C8, thus ensuring that the left-hand section of the valve V6 is brought to the anode current cut-off condition at the end of a pulse applied to the terminal 146. When the positive voltage backward-marking condition (50 volts positive) appears at the inhibiting input terminal 147, the resulting change of voltage across the resistor R22 causes the right-hand section of the valve V6, normally biased to the anode current cut-off condition, to take an anode current which exceeds the current in the control resistor R18 and thereby prevents the gating rectifier MR8 from being biased to the non-conducting condition. Thus in this case also the requisite inhibiting action is brought about.

Referring now to Fig. 7, this shows the form which the gate I8 in Fig. 3A may take. This form is in many respects similar to that of Fig. 6. There is an input gate circuit of the coincidence type corresponding exactly to that of Fig. 6, and comprising an input terminal 131, a first input capacitor C3, a pulse supply terminal 132, a second input capacitor C4, control resistors R23 and R24 and R25, and gating rectifiers MR4 and MR5 and MR10. A triode V7, serving as an output valve, has a load resistor R26 connected in its cathode circuit, and has its cathode connected to an output terminal 140. A triode V8 serves as an inhibiting valve. The grid circuit of the triode V8 includes a grid resistor R27 associated with two inhibiting input circuits. A first inhibiting input circuit comprises an inhibiting input terminal 141, a capacitor C5, and rectifiers MR11 and MR12, and a second inhibiting input circuit comprises an inhibiting input terminal 142, a capacitor C9, and rectifiers MR13 and MR14. The input terminal 131 is connected to the output pulse highway 7 of the backward-marking multiplex MX2 with which the gate I8 is associated, and the output terminal 140 is connected to the relevant main backward-marking pulse highway 9. The inhibiting input terminal 141 is connected to the output pulse highway 3 of the relevant forward-marking multiplex MX1, and the inhibiting input terminal 142 is connected to the output pulse highway 4 of the relevant busy-marking multiplex MX3. Provided that no positive pulse appears at one or both of the inhibiting input terminals 141 and 142 at the time, the appearance of a positive pulse at the input terminal 131 gives rise to the production of a positive pulse at the output terminal 140. When a positive pulse appears at one of the terminals 141 and 142, the relevant inhibiting input circuit produces a voltage across the grid resistor R27 of the inhibiting input valve V8 which causes this valve, normally biased to the anode current cut-off condition, to take an anode current which exceeds the current in the control resistor R25 and thereby prevents the gating rectifier MR10 from being biased to the nonconducting condition. Thus a pulse appearing at the input terminal 131 at the same time as a pulse appears at an inhibiting input terminal produces no corresponding pulse at the output terminal 140. The rectifiers MR12 and MR14 effectively isolate the terminals 141 and 142 from each other.

Referring now to Fig. 8, this shows the form which each of the pulse lengtheners L1 and L2 in Fig. 3A may take. In this form, there is an input circuit which comprises an input terminal 152, an input rectifier MR19, a delay capacitor C10, and a leak resistor R28. The pulse lengthener also includes a pentode V9 and two triodes V10 and V11. The valves V9 and V10 are resistance coupled by means of resistors R29, R30, and R31. The valves V10 and V11 are resistance coupled by means of resistors R32, R33, and R34. The valve V11 has a load resistor R35 connected in the cathode circuit and has its cathode connected to an output terminal 153. The rectifiers MR20 and MR21 together limit the variation of the potential of the output terminal 153 to the range earth to 50 volts positive. In the case of the pulse lengthener L1 of Fig. 3A, the input terminal 152 is connected to the main forward-marking pulse highway 12 with which the pulse lengthener is associated, and the output terminal 153 is connected to the relevant forward-marking wire 15. In the case of the pulse lengthener L2 of Fig. 3A, the input terminal 152 is connected to the main backward-marking pulse highway 9 with which the pulse lengthener is associated, and the output terminal 153 is connected to the relevant backward-marking wire 16. The valve V9 is normally biased to the anode current cut-off condition, so that the normal value of the anode current of the valve V10 is a maximum value and the normal value of the anode current of the valve V11 is a minimum value. Whilst the anode current of the valve V11 is at its normal minimum value, the rectifier MR20 is conducting and holds the output terminal 153 at earth potential. When a positive pulse appears at the input terminal 152, the delay capacitor C10 is rapidly charged through the input rectifier MR19, and the valve V9 is rendered conducting. On the termination of the pulse, the rectifier MR19 is biased to the non-conducting condition by the charge on the capacitor C10. Between the successive positive pulses of a train of pulses appearing at the input terminal 152, the charge on the capacitor C10 slowly leaks away through the leak resistor R28, but the charge remains sufficient to keep the anode current of the valve V9 at a substantial value. Whilst the valve V9 is thus passing anode current, the anode current of the valve V11 is sufficiently higher than normal to cause the rectifier MR21 to conduct and hold the output terminal 153 at 50 volts positive.

Referring now to Fig. 9, this shows the form which the pulse lengthener L3 in Fig. 3A may take. In this form, the rectifier MR15, the capacitor C11, and the resistor R39 correspond to the rectifier MR19, the capacitor C10, and the resistor R28 respectively of Fig. 8. In this form, however, a single-stage amplifier of the so-called cathode-follower type is interposed between the input terminal 148 of the pulse lengthener and the rectifier MR15. This amplifier comprises input resistors R36 and R37, a triode V12, and a load resistor R38, and serves to prevent the delay capacitor C11 from constituting an undesirable capacitative load on the input circuit of the associated gate I8. The pulse lengthener also includes a pentode V13 which has a load resistor R40 connected in the anode circuit and has its anode connected to an output terminal 149. The input terminal 148 is connected to the output pulse highway 7 of the backward-marking multiplex MX2 with which the pulse lengthener is associated, and the output terminal 149 is connected to the output wire 45 connected to the marker. The valve V13 is normally biased to the anode current cut-off condition, so that the potential of the output terminal 149 is normally 100 volts positive. When a positive pulse appears at the input terminal 148, the valve V13 is rendered conducting and remains so between successive impulses of a train. Whilst the valve V13 is in the conducting condition, the output terminal has a potential which is maintained substantially lower than the normal 100 volts positive to constitute the number-obtainable condition.

Referring now to Fig. 10, this shows the form which the isolating gate G7 and the pulse-selection gate G2 of Fig. 3A may together take. In the gating arrangement shown in this figure, the rectifiers MR16 and MR17 and the resistor R41 constitute the isolating gate G7, and the wire designated 11 constitutes the main combined-marking pulse highway 11 of Fig. 3A. The gate G7 has two input circuits, one comprising an input terminal 150 and the rectifier MR16, and the other comprising an input terminal 151 and the rectifier MR17. Both these input circuits are connected to the resistor R41, which serves as a load resistor in respect of them, and are also connected to the pulse highway 11. The input terminal 150 is connected to the main forward-marking pulse highway 12, and the input terminal 151 is connected to the main backward-marking pulse highway 9. On the appearance of a positive pulse at either or both of the input terminals 150 and 151, the pulse is transmitted to the pulse highway 11. On the appearance of a positive pulse at either of the input terminals, its transmission to the other input terminal is prevented by the rectifier in the input circuit to which the last-mentioned terminal belongs. The pulse-selection gate G2 has two input circuits, a pulse input circuit constituted by the pulse highway 11, and a control input circuit comprising an input terminal 154 and an input rectifier MR18 and a grid resistor R43. The pulse highway 11 is connected to the control grid of a pentode V14, and the control input circuit is associated with the suppressor grid of this valve. The valve V14 is coupled to a triode V15 by an anode load resistor R42, a capacitor C12, and a rectifier MR22. The valve V15 has a load resistor R44 connected in the cathode circuit and has its cathode connected to an output terminal 155. The input terminal 154 is connected to the relevant control wire 38, and the output terminal 155 is connected to the selection pulse highway 18. The valve V14 is normally biased to the anode current cut-off condition both by virtue of the potential of its control grid and of the potential of the suppressor gird. When a positive pulse appears on the pulse highway 11 at a time when the potential of the input terminal 154 is rendered over 50 volts positive by the appearance of the setting-initiating condition on the relevant control wire 38, the valve V14 passes anode current with the result that the anode current of the valve V15 is reduced to produce a negative pulse at the output terminal 155.

Figure 11:
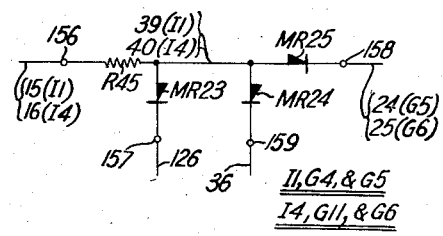

Referring now to Fig. 11, this shows the form which each of two combinations of elements of Figs. 3A and 3B may take. One of these combinations consists of the forward-marking gate I1 and the isolating gate G4 of Fig. 3A, and the isolating gate G5 of Fig. 3B. The other of these combinations consists of the backward-marking gate I4 and the isolating gate G11 of Fig. 3A, and the isolating gate G6 of Fig. 3B. The gating arrangement shown in Fig. 11 has a marking input terminal 156, an inhibiting input terminal 157, a first output terminal 158, and a second output terminal 159, and comprises a resistor R45 and three gating rectifiers MR23, MR24, and MR25. In the case of the combination consisting of the gates I1, G4, and G5, the marking input terminal 156 is connected to the relevant forward-marking wire 15, and the first output terminal 158 is connected to the input wire 24 of the relevant amplifier FMA and the wire connected to the right-hand side of the resistor R45 constitutes the forward-marking wire 39 of the link concerned. In the case of the combination consisting of the gates I4, G11, and G6, the marking input terminal 156 is connected to the relevant backward-marking wire 16, and the first output terminal 158 is connected to the input wire 25 of the relevant amplifier BMA, and the wire connected to the right-hand side of the resistor R45 constitutes the backward-marking wire 40 of the link concerned. The inhibiting input terminal 157 is connected to the private wire 126 of the link concerned, and the second output terminal 159 is connected to the relevant marking wire 36. The wire 126 is initially at zero potential and in these circumstances a marking condition (50 volts positive) can be transmitted from the input terminal 156 to the output terminals 158 and 159. When the holding and busy-marking condition (earth) appears on the private wire 126, the connection over the rectifier MR23 serves to prevent the wire 39 or 40 (as the case may be) from going positive, and thereby serves to prevent the transmission of a marking condition from the input terminal 156 to the output terminals 158 and 159. The rectifiers MR24 and MR25 serve to prevent the transmission of a marking condition from the output terminals 159 and 158 to the wire 39 or 40.

Figure 12:
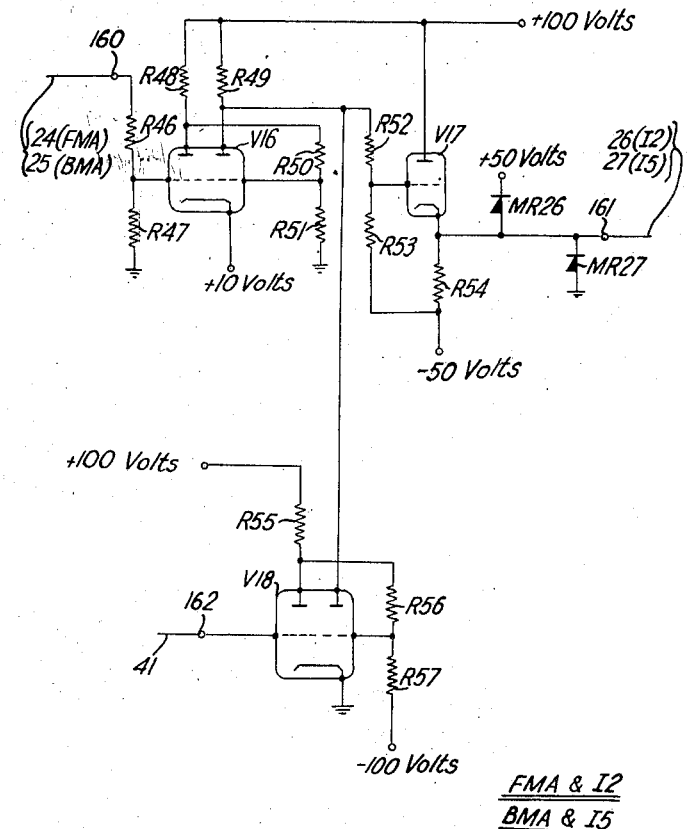

Referring now to Fig. 12, this shows the form which each of two combinations of elements of Fig. 3B may take. One of these combinations consists of the amplifier FMA and the forward-marking gate I2, and the other consists of the amplifier BMA and the backward-marking gate I5. The amplifying and gating arrangement shown in Fig. 12 has a marking input terminal 160, a control input terminal 162, and an output terminal 161. In the case of the combination consisting of the amplifier FMA and the gate I2, the marking input terminal 160 is connected to the relevant wire 24 and the output terminal 161 is connected to the relevant forward-marking wire 26. In the case of the combination consisting of the amplifier BMA and the gate I5, the marking input terminal 160 is connected to the relevant wire 25 and the output terminal 161 is conected to the relevant backward-marking wire 27. The control input terminal 162 is connected to the control wire 41. The amplifying and gating arrangement includes two amplifying valve V16 and V17 and an inhibiting valve V18. The valve V16 is a double triode. The grid of the left-hand section of the valve V16 is coupled to the terminal 160 by two resistors R46 and R47, and this section has an anode load resistor R48 and has its anode coupled to the grid of the right-hand section of the valve by two resistors R50 and R51. The last-mentioned section has an anode load resistor R49 and has its anode coupled to the grid of the valve V17 by two resistors R52 and R53. The valve V17 is a triode and has a load resistor R54 connected in its cathode circuit. Two rectifiers MR26 and MR27 serve to limit the variation of the potential of the output terminal 161 to the range earth to 50 volts positive. The valve V18 is a double triode. The left-hand section of this valve has its grid connected to the control input terminal 162 and has an anode load resistor R55 and has its anode coupled to the grid of the right-hand section of the valve by two resistors R56 and R57. The last-mentioned section has its anode connected to the anode of the right-hand section of the valve V16. Normally, the potential of the control input terminal 162 is such that anode current flows in the left-hand section of the valve V18 and causes the right-hand section to be biased to the anode current cut-off condition. When a positive marking condition appears at the marking input terminal 160 at a time when the potential of the control input terminal 162 is normal, the resulting lowering of the potential of the anode of the left-hand section of the valve V16 causes the right-hand section to be biased to the anode current cut-off condition. This causes the anode current of the valve V17 to increase with the result that the potential of the output terminal 161 changes from earth to 50 volts positive, so that the marking condition is in effect repeated as a full 50 volts positive condition. On the appearance of the inhibiting condition at the control input terminal 162, the left-hand section of the valve V18 is biased to the anode current cut-off condition with the result that the right-hand section ceases to be so biased. In these circumstances, the appearance of a positive marking condition at the terminal 160 is ineffective as regards raising the potential of the output terminal 161, since the flow of anode current through the right-hand section of the valve V18 prevents the potential of the anode of the right-hand section of the valve V16 from rising sufficiently to bring about a rise of the potential of the terminal 161.

Figure 13:
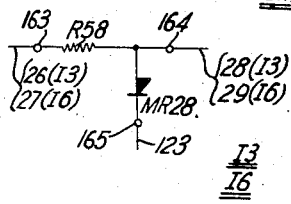

Referring now to Fig. 13, this shows the form which each of the gates I3 and I6 in Fig. 3B may take. In this form, there is a marking input terminal 163, an input resistor R58, a gating rectifier MR28, an inhibiting input terminal 165, and an output terminal 164. In the case of the gate I3, the marking input terminal 163 is connected to the relevant forward-marking wire 26, and the output terminal 164 is connected to the relevant forward-marking wire 28. In the case of the gate I6, the marking input terminal 163 is connected to the relevant backward-marking wire 27, and the output terminal 164 is connected to the relevant backward-marking wire 29. The inhibiting input terminal 165 is connected to the private wire 123 of the terminal trunk concerned. The wire 123 is initially at zero potential, and in these circumstances a marking condition (50 volts positive) can be transmitted from the marking input terminal 163 to the output terminal 164. When the holding and busy-marking condition (earth) appears on the private wire 123, the connection over the rectifier MR28 serves to prevent the output terminal 164 from going positive and thereby serves to prevent the appearance of a marking condition at the marking input terminal 163 from producing a marking condition at the output terminal 164.

Figure 14:
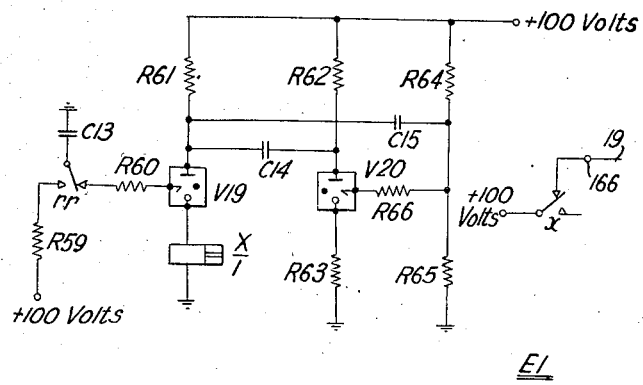

Referring now to Fig. 14, this shows the form which the circuit element E1 in Fig. 3B may take, the contact rr which controls the circuit element E1 being also shown in the figure. The arrangement has an output terminal 166, which is connected to the restoring wire 19, and includes two cold-cathode gas-filled triodes V19 and V20 and a high-speed relay X. The triode V20 is normally conducting by reason of the positive potential applied to its trigger electrode over a resistor R66, this potential being derived from a potentiometer constituted by two resistors R64 and R65. Normally, the triode V19 is not conducting. The contact rr is shown in its unoperated condition. Upon the operation of this contact, a capacitor C13 is charged in the circuit over front contact rr and a charging resistor R59. Upon the subsequent restoration of the contact rr, the potential across the capacitor C13 is applied to the trigger electrode of the triode V19 over a resistor R60, with the result that this valve fires. When the triode V19 fires, the relay X connected in the cathode circuit is operated and at its contact x disconnects the output terminal 166 from 100 volts positive. A load resistor R61 is connected in the anode circuit of the triode V19, so that the potential of the anode falls when the valve fires. This fall is transmitted by a capacitor C14 to the anode of the triode V20, with the result that the last-mentioned valve, which has an anode load resistor R62 and a cathode load resistor R63, is extinguished. The fall referred to is also transmitted, by a capacitor C15, to the junction between the resistors R64 and R65, and thence to the trigger electrode of the triode V20. The result of this is that the triode V20 cannot fire again until the charge on the capacitor C15 has sufficiently leaked away over the resistors connected to this capacitor. When the charge on the capacitor C15 has so leaked away, the triode V20 again fires. The resulting fall of the potential of the anode of the triode V20 is transmitted by the capacitor C14 to the anode of the triode V19, with the consequences that the last-mentioned valve is extinguished and the relay X is released. Nothing further happens until the contact rr is again operated and a sequence as just described is thereby again initiated.

Figure 15:
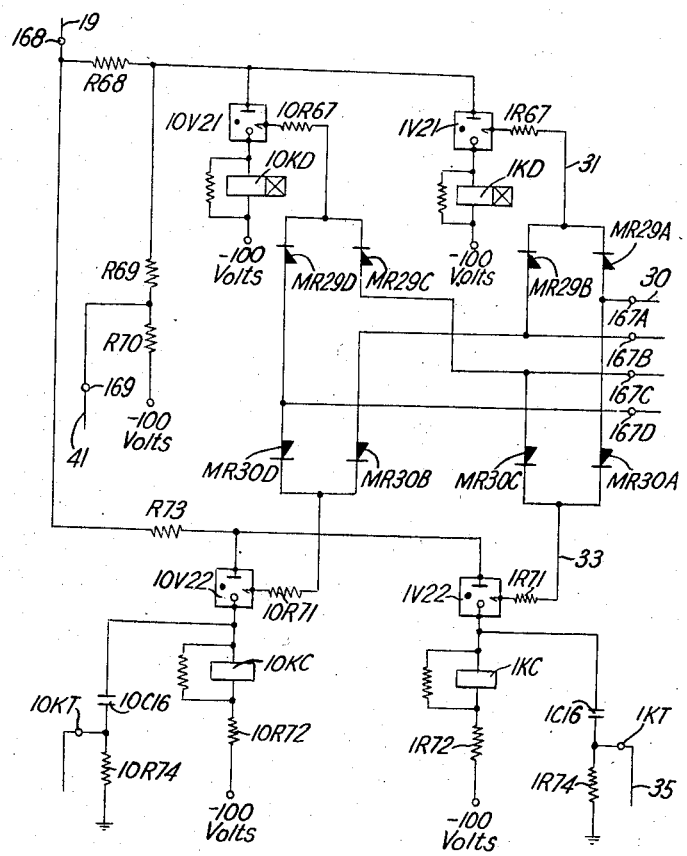

Referring now to Fig. 15, this shows the form which the isolating gates G8 and G9 and the electronic storage circuits ES1 and ES2 in Fig. 3B may together take. Four gates G8 and four gates G9 are represented. Only typical elements of the storage circuits are represented. The windings, but not the contacts, of the electromagnetic relays associated with the electronic storage elements represented are shown in the figure. The arrangement has an input terminal for each secondary-side terminal trunk of the link frame. Only four such input terminals, designated 167A, 167B, 167C, and 167D, are shown. Each such terminal is connected to the setting wire 30 of the relevant secondary-side terminal trunk, as indicated in the case of the particular input terminal 167A in the figure. The arrangement has a supply terminal 168, a control output terminal 169, and ten setting output terminals, one for each secondary basic switch of the link frame. Only two setting output terminals, designated 1KT and 10KT, are shown. The supply terminal 168 is connected to the restoring wire 19, and the control output terminal 169 is connected to the control wire 41. Each setting output terminal is connected to the wire 35 corresponding to the secondary basic switch concerned, as indicated in the case of the particular setting output terminal 1KT in the figure. For each column of vertical units with which it is concerned, the first electronic storage circuit ES1 comprises a cold-cathode gas-filled triode. Only two such triodes, designated 1V21 and 10V21 are shown. In the case of each such triode, the slow-operating electromagnetic relay KD corresponding to the relevant column of vertical units is connected in the cathode circuit. In the figure, the relay KD controlled by the triode 1V21 is designated 1KD, and the relay KD controlled by the triode 10V21 is designated 10KD. The inductive winding of each relay is shunted by a non-inductive shunt as shown in the figure. Each triode of the first electronic storage circuit ES1 has its trigger electrode connected over an individual input resistor (such as 1R67 or 10R67) to an input wire which, as indicated in the case of the particular triode 1V21 in the figure, constitutes the input wire 31 corresponding to the column of vertical units concerned. Each such input wire is linked, by rectifiers such as MR29A, MR29B, MR29C, and MR29D which constitute the relevant gates G8, to the input terminals connected to the setting wires 30 of those secondary-side terminal trunks which are associated with the column of vertical units concerned. There is of course a rectifier as just mentioned, constituting a gate G8, for each secondary-side terminal trunk of the link frame. All the triodes of the first electronic storage circuit ES1 have their anodes connected to the supply terminal 168 over a common resistor R68. The control output terminal 169 is connected to the junction between two resistors R69 and R70 which are connected in series between the last-mentioned anodes and 100 volts negative. For each of the ten secondary basic switches of the link frame, the second electronic storage circuit ES2 comprises a cold-cathode gas-filled triode. Only two such triodes, designated 1V22 and 10V22, are shown. In the case of each such triode, the electromagnetic relay KC corresponding to the relevant secondary basic switch is connected in the cathode circuit, which also includes a series resistor (such as 1R72 or 10R72). In the figure, the relay KC controlled by the triode 1V22 is designated 1KC, and the relay KC controlled by the triode 10V22 is designated 10KC. The inductive winding of each relay is shunted by a non-inductive shunt as shown in the figure. Each triode of the second electronic storage circuit ES2 has its trigger electrode connected over an individual input resistor (such as 1R71 or 10R71) to an input wire which, as indicated in the case of the particular triode 1V22 in the figure, constitutes the input wire 33 corresponding to the secondary basic switch concerned. Each such input wire is linked, by rectifiers such as MR30A, MR30B, MR30C, and MR30D which constitute the relevant gates G9, to the input terminals connected to the setting wires 30 of those secondary-side terminal trunks which are associated with the secondary basic switch concerned. There is of course a rectifier as just mentioned, constituting a gate G9, for each secondary-side terminal trunk of the link frame. All the triodes of the second electronic storage circuit ES2 have their anodes connected to the supply terminal 168 over a common resistor R73. Each such triode has individual to it a differentiating circuit element connected to the relevant setting output terminal and comprising a capacitor (such as 1C16 or 10C16) in series with a resistor (such as 1R74 or 10R74). Normally, all the input terminals such as 167A are at a potential of 50 volts negative, and all the triodes of the first and second electronic storage circuits ES1 and ES2 are in the non-conducting condition. When a setting-initiating condition (earth) appears on the setting or "S" wire 30 connected to an input terminal, the relevant triode of the storage circuit ES1 and the relevant triode of the storage circuit ES2 fire in response to the resulting increase of potential of the trigger electrodes of these valves. For example, if the setting-initiating condition appears on the setting wire 30 connected to the particular input terminal 167A, then the triodes 1V21 and 1V22 fire, since the trigger electrode of the triode 1V21 is connected to the terminal 167A over the gating rectifier MR29A and the resistor 1R67, and the trigger electrode of the triode 1V22 is connected to this terminal over the gating rectifier MR30A and the resistor 1R71. The firing of a triode such as 1V21 as just described causes a lowering of the potential of the control output terminal 169, this lowering being sufficient to constitute the requisite inhibiting condition. The firing referred to also causes a positive-going pulse, constituting a setting-initiating condition, to be produced at the relevant setting output terminal (such as 1KT) by the relevant differentiating circuit element (such as the capacitor 1C16 and the resistor 1R74). The firing referred to also brings about the operation, in turn, of the relevant relay KC (such as 1KC) and the relevant relay KD (such as 1KD). It should be noted that the recording of the identity of the particular column of vertical units of secondary basic switches which is concerned, and the recording of the identity of the particular secondary basic switch which is concerned, and the production of the inhibiting condition at the control output terminal 169, and the production of the setting-initiating condition at the relevant setting output terminal, are all effected by the firing of the triodes and independently of the operating lags of the electromagnetic relays. Thus the holding time of the marker on a call is not prolonged owing to these lags.

Referring now to Fig. 16, this shows the form which the gates G1 and G10 and the electronic storage circuit ES3 in Fig. 3A may together take. Only typical elements of the storage circuit are represented. Two gates G1 and two gates G10 are represented. The windings, but not the contacts, of the electromagnetic relays associated with the electronic storage elements represented are shown in the figure. There is a gate G1 for each link of the link frame. Each such gate comprises a marking input terminal such as 171A or 171K, a setting input wire such as 172A or 172K, an output wire such as 173A or 173K, an input resistor such as R75A or R75K, and a pair of gating rectifiers such as MR31A and MR32A, or MR31K and MR32K. Each marking input terminal as just referred to is connected to the marking wire 36 of the link concerned, as indicated in the case of the particular marking input terminal 171A in the figure. Each setting input wire as just referred to is connected to the output wire 34 of the particular gate G10 which corresponds to the secondary basic switch to which the link concerned is connected, as indicated in the case of the particular setting input wire 172A in the figure. Each output wire as just referred to is connected to the relevant input wire 37 of the third electronic storage circuit ES3, as indicated in the case of the particular output wire 173A in the figure. The relevant input wire 37 is of course the one which corresponds to the particular primary basic switch to which the link concerned is connected. There is a gate G10 for each secondary basic switch. Each such gate comprises a cold-cathode gas-filled triode such as 1V23 or 10V23, an input terminal such as 1T or 10T, an input resistor such as 1R76 or 10R76, a cathode resistor such as 1R77 or 10R77, and an output resistor such as 1R78 or 10R78. The input terminal of each gate G10 is connected to the wire 35 corresponding to the secondary basic switch concerned, as indicated in the case of the particular input terminal 1T in the figure. The output resistor of each gate G10 is directly connected between the cathode of the valve of the gate and the wire which constitutes the output wire (34) of the gate. The arrangement has a supply terminal 174 which is connected to the restoring wire 19. The anodes of the valves of the gates G10 are connected to this terminal over a common resistor R79. For each of the ten primary basic switches of the link frame, the third electronic storage circuit ES3 comprises a cold-cathode gas-filled triode. Only two such triodes, designated 1V24 and 10V24, are shown. In the case of each such triode, the electromagnetic relay KB corresponding to the relevant primary basic switch is connected in the cathode circuit, which also includes a series resistor (such as 1R80 or 10R80). In the figure, the relay KB controlled by the triode 1V24 is designated 1KB, and the relay KB controlled by the triode 10V24 is designated 10KB. The inductive winding of each relay is shunted by a non-inductive shunt as shown in the figure. Each triode of the third electronic storage circuit ES3 has its trigger electrode connected over an individual input resistor (such as 1R81 or 10R81) to an input wire which, as indicated in the case of the particular triode 1V24 in the figure, constitutes the input wire 37 corresponding to the primary basic switch concerned. All the triodes of the storage circuit ES3 have their anodes connected to the supply terminal 174 over a common resistor R82. Each such triode has its cathode connected to a control output terminal (such as 1CT or 10CT). Each control output terminal is connected to the relevant control wire 38, as indicated in the case of the particular control output terminal 1CT in the figure. Normally, all the triodes of the gates G10 and the third electronic storage circuit ES3 are in the non-conducting condition. The appearance of a marking condition (50 volts positive) at a marking input terminal (such as 171A) does not in itself cause the associated triode (such as 1V24) of the storage circuit ES3 to fire. This is owing to the effect of the connection made, within the relevant gate G10, to the setting input wire (such as 172A) of the gate G1 concerned, which connection normally operates to maintain the potential of the trigger electrode of the last-mentioned triode at 50 volts negative. When a positive-going pulse, constituting a setting-initiating condition, appears at an input terminal (such as 1T) of a gate G10, the triode of this gate fires, with the consequence that the potential of the setting input wire (such as 172A) of each gate G1 associated with this gate G10 is raised. In each gate G1 in which the potential of the setting input wire (such as 172A) is thus raised, and in which the condition also obtains that the marking input terminal (such as 171A) is at the marking potential of 50 volts positive, the potential of the output wire (such as 173A) assumes a value which tends to cause the associated triode (such as 1V24) of the storage circuit ES3 to fire. By reason of the presence of the common anode resistor R82, only one valve of the storage circuit ES3 actually fires in respect of a pulse appearing at an input terminal (such as 1T) of a gate G10. Such firing increases the potential of the relevant control output terminal (such as 1CT), and also brings about the operation of the relevant relay KB (such as 1KB). It should be noted that the recording of the identity of the particular primary basic switch which is concerned, and the production of the setting-initiating condition at the relevant control output terminal (such as 1CT), are effected by the firing of the triode of the storage circuit ES3 and independently of the operating lag of the electromagnetic relay. Thus the holding time of the marker on a call is not prolonged owing to this lag.

Referring now to Fig. 17, this shows the form which the electronic storage circuit ES4 in Fig. 3A may take. This form of storage circuit comprises a storage unit for each column of vertical units with which it is concerned. Only one such storage unit is represented in the figure. Each storage unit includes an input gate, an input pulse lengthener, and a cold-cathode gas-filled triode such as 1V25. The winding, but not the contacts, of the particular electromagnetic relay KA which is associated with the storage unit represented is included in the figure, and is designated 1KA. Each input gate comprises gating rectifiers such as 1MR33, 1MR34, and 1MR35, resistors such as 1R83 and 1R84, a capacitor such as 1C17, and a pulse supply terminal such as 1PT. The pulse supply terminal of an input gate is connected to a source of negative pulses which occupy the time positions pertaining to the relevant one of the plurality of channels of the time-division-multiplex system. All the input gates are associated with a common pulse input terminal 175 which is connected to the selection pulse highway 18. Each input pulse lengthener comprises a capacitor 1C18 and a rectifier 1MR36. Each valve such as 1V25 has its trigger electrode connected to the associated pulse lengthener over a resistor as 1R85, and has the winding of the associated electromagnetic relay such as 1KA connected in its cathode circuit, the inductive winding of the relay being shunted by a non-inductive shunt as shown in the figure. The triodes of all the storage units have their anodes connected to a supply terminal 176 over a common resistor R86. The last-mentioned supply terminal is connected to the restoring wire 19. The storage circuit includes a triode V26 which is coupled to the cold-cathode gas-filled triodes such as 1V25 by the resistor R86 and two further resistors R87 and R88. A load resistor R89 is included in the cathode circuit of the triode V26, and the cathode of this valve is directly connected to the rectifiers such as 1MR36 and to a control output terminal 177 connected to the wire 21. Two rectifiers MR37 and MR38 together limit the variation of potential of the control output terminal 177 to the range earth to 100 volts positive. Normally, all the gas-filled triodes such as 1V25 are in the non-conducting condition and the terminal 177 is at a potential of 100 volts positive. A negative pulse received at the pulse input terminal 175 when the storage circuit is at normal causes the gating rectifier such as 1MR35 in the corresponding storage unit to be biased to the non-conducting condition and the charge on the capacitor such as 1C18 to be increased by current flow through the rectifier such as 1MR36. The storage unit concerned is of course the one in which a negative pulse is applied to the pulse supply terminal such as 1PT coincidentally with the said negative pulse received at the terminal 175. At the end of the last-mentioned pulse the valve such as 1V25 of the storage unit concerned fires by reason of the charge on the capacitor such as 1C18. This firing of one of the valves of the storage units renders it impossible for a further one of these valves to strike for the time being, this result being not only directly due to the fact that such firing lowers the anode potential of all these valves but also being due to the fact that this lowering of the anode potential affects the triode V26 and causes the cathode of this triode and the terminal 177 to assume earth potential. Earth potential on the terminal 177 constitutes the control-set condition. The firing of a triode such as 1V25 brings about the operation of the relevant relay KA (such as 1KA). It should be noted that the recording of the identity of the particular column of vertical units of primary basic switches which is concerned, and the production of the control-set condition at the control output terminal 177, are effected by the firing of the gas-filled triode of the revelant storage unit and independently of the operating lag of the electromagnetic relay associated with this unit. Thus the holding time of the marker on a call is not prolonged owing to this lag.

Referring now to Fig. 18, this shows the form which the differentiating circuit element B1 in Fig. 3A may take. This form consists simply of a capacitor C19 and a resistor R90 together with an input terminal 178 and an output terminal 179. The input terminal 178 is connected to the wire 21, and the output terminal 179 is connected to the link frame control-set wire 22. When the potential of the wire 21 changes from 100 volts positive to become earth, the resulting discharge of the capacitor through the resistor R90 produces a brief negative pulse at the output terminal 179.

Referring now to Fig. 19, this shows the form which the gate G3 in Fig. 3A may take. In this form there is a control input terminal 180, an inhibiting input terminal 181, and an output terminal 182. The control input terminal 180 is connected to the control wire 23 associated with the relevant primary basic switch, and the inhibiting input terminal 181 is connected to the wire 21. The output terminal 182 is connected to the relevant signal wire 44. The gate includes a pair of input resistors R91 and R92, a further pair of input resistors R94 and R95, and a pentode V27 which has a load resistor R93 in its anode circuit and which is normally biased to the anode current cut-off condition. Normally, the inhibiting input terminal 181 is at 100 volts positive, with the result that the potential of the suppressor grid of the valve V27 is such that the anode current can be controlled by the control grid. In these circumstances, upon the appearance of the backward-marking condition (50 volts positive) at the control input terminal 180 the resulting increase of the potential of the control grid causes anode current to flow. This in turn lowers the potential of the output terminal 182 to a value which constitutes the control-not-busy condition. Whilst the electronic storage circuit ES4 is not at normal, the terminal 181 is at earth potential and the appearance of the backward-marking condition at the terminal 180 is ineffective as regards changing the potential of the terminal 182.

The register secondary link frames, intermediate link frames, and outgoing secondary link frames may, with their respective control circuits, be constituted on, and operate on, lines which are similar in the case of each of these kinds of frames, except that a register secondary link frame has to provide eight through wires in respect of each call set up over it. By way of example, descriptions will be given of an intermediate link frame and its control circuit, the control circuit being of one form, and of an intermediate link frame and its control circuit, the control circuit being of an alternative form.

Referring now to Figs. 20A and 20B, these when placed side by side with Fig. 20B to the right of Fig. 20A together constitute a schematic circuit diagram of an intermediate link frame IF (see Fig. 2) and its control circuit, this schematic circuit diagram being of the so-called functional type. To avoid unnecessary detailed description, each element of Figs. 20A and 20B which wholly corresponds to an element of Figs. 3A and 3B is given the same designation as the corresponding element of Figs. 3A and 3B with the addition of the suffix W. In the case of relay contact designations, the suffix is placed directly after the alphabetical portion of the designation (for example the contacts of relay KCW are designated kcw1 and kcw2). Each terminal trunk and each link includes a positive line wire (116W, 121W, 124W), a negative line wire (117W, 122W, 125W), a private or "P" wire (118W, 123W, 126W), and a backward-marking or "BM" wire (127, 29W, 40W). Each terminal trunk also includes a setting or "S" wire (187, 30W). Each primary basic switch has individual to it a backward-marking or "BM" wire 129, and a backward-marking gate I9 which controls the extension of a backward-marking condition, from the backward-marking wire 127 of any of the primary-side terminal trunks connected to the switch, to the said backward-marking wire 129. Each of the backward-marking wires 127 concerned is linked to the gate I9 by an isolating gate G15 and an amplifier BMA2, there being a gate G15 for each of these wires and the amplifier BMA2 being common to all of them. Each link has individual to it a backward-marking gate I4W which controls the extension of a backward-marking condition from the backward-marking wire 129 of the relevant primary basic switch to the backward-marking wire 40W of the link. The backward-marking arrangements on the secondary side of the intermediate link frame are similar to those on the secondary side of the primary link frame of Figs. 3A and 3B, except that there are no gates such as I5. The control circuit of the link frame includes four electronic storage circuits, namely a first electronic storage circuit ES1A, a second electronic storage circuit ES2W, a third electronic storage circuit ES3W, and a fourth electronic storage circuit ES4A. The storage circuit ES1A corresponds to the storage circuit ES1 of Fig. 3B except that it does not serve to produce an inhibiting condition at a control terminal. The storage circuit ES2W corresponds to, and is similar to, the storage circuit ES2 of Fig. 3B. The storage circuit ES3W corresponds to, and is similar to, the storage circuit ES3 of Fig. 3A. The fourth electronic storage circuit ES4A serves to choose and record which particular column of vertical units of primary basic switches is concerned when a setting-initiating condition is received over a secondary-side terminal trunk of the intermediate link frame. For each such column, the storage circuit ES4A comprises an input wire 130 and a cold-cathode gas-filled valve which is connected to control a slow-operating electromagnetic relay KAW corresponding to the column. Provided that the storage circuit ES4A is at normal, the application of a setting-initiating condition to a wire 38W corresponding to a primary basic switch (as a result of the firing of a cold-cathode valve of the storage circuit ES3W) causes a setting-initiating condition to be applied to each of the input wires 130 which corresponds to a column of vertical units in which the terminal trunk connected to the vertical unit of the primary basic switch concerned is backward-marked. This has the result that the cold-cathode valve corresponding to one, and one only, of these input wires is fired and initiates the operation of the corresponding relay KAW and causes a setting-initiating condition to be applied to an output wire 186 corresponding to the column of vertical units concerned. The association between the wire 38W corresponding to a primary basic switch and an input wire 130 of the storage circuit ES4A is by way of a gate G12, individual to the primary basic switch, and a gate G13 individual to the terminal trunk which is connected to the particular vertical unit of this switch to which the input wire 130 corresponds. During periods in which the storage circuit ES4 is off normal, it produces an inhibiting condition on a control wire 184, thereby causing the backward-marking gates I9 of all the primary basic switches of the intermediate link frame to block the extension of the backward-marking condition to the backward-marking wires 129 of these switches. The wire 184 is connected, over a differentiating circuit element E2, to an intermediate link frame control-set wire 185. There is a gate G13 for each primary-side terminal trunk of the intermediate link frame. The gate G13 individual to a primary-side terminal trunk is arranged so that the application of a setting-initiating condition to the associated wire 38W (with the consequent application of a setting-initiating condition to the associated wire 188) only causes a setting-initiating condition to be applied to the associated wire 130 if a backward-marking exists on the backward-marking wire 127 of the trunk. For each primary-side terminal trunk of the link frame, there is a setting-wire gate G14 which serves to apply a setting-initiating condition to the setting wire 187 of the trunk in response to the concurrent existence of setting-initiating conditions on the particular wires 38W and 186 which correspond to the trunk. The association between the wire 38W, corresponding to a primary basic switch, and the gate G14 is by way of a gate G30 individual to the primary basic switch and having an output wire 230. The contact arrangements for operating the select magnets and for operating and holding the hold magnets are similar to those of Figs. 3A and 3B.

Still referring to Figs. 20A and 20B, when the positive voltage backward-marking condition appears on the backward-marking wire 127 of a primary-side terminal trunk of the intermediate link frame this condition is extended (assuming that the storage circuit ES4A is at normal) over the gate G15, individual to the trunk, and the amplifier BMAA and gate I9, individual to the relevant primary basic switch, to the backward-marking wire 129 of this switch. From the wire 129, the positive voltage backward-marking condition is further extended to the backward-marking wire 40W of each free link connected to the particular primary basic switch, the extension of this condition to an engaged link being blocked by the relevant gate I4W. As regards each link to which a backward-marking is thus extended, the positive voltage backward-marking condition is further extended through the relevant gates G6W and wire 25W and amplifier BMAW and gate I6W, to the backward-marking wire 29W of each free terminal trunk of the secondary basic switch to which the link is connected. When, as a consequence of the extension of the backward-marking condition, a setting-initiating condition (earth) appears on the setting wire 30W of a backward-marked secondary-side terminal trunk, each of the four electronic storage circuits ES1A, ES2W, ES3W, and ES4A is set and initiates the operation of an appropriate electromagnetic relay, as will be clear from the description already given. In response to the setting of the storage circuits ES3W and ES4A the gate G14 associated with the primary-side terminal trunk concerned applies a setting-initiating condition to the setting wire 187 of this trunk. In response to the setting of the storage circuit ES4A, the differentiating circuit element E2 applies a control-set condition for a brief period to the intermediate link frame control-set wire 185. The further operation will be clear from the description already given.

Referring now to Fig. 21, this shows the form which the gates G12, G13, G14, and G30 and the electronic storage circuit ES4A in Fig. 20A may together take. Only typical elements of the storage circuit are represented. The gates G12 and G30 individual to a primary basic switch are constituted as a combined gate. Two such combined gates are represented in the figure. Two gates G13 and two gates G14 are represented. The windings, but not the contacts, of the electromagnetic relays associated with the electronic storage elements represented are shown in the figure. There is a gate G13 for each primary-side terminal trunk of the intermediate link frame. Each such gate comprises a marking input terminal such as 216A or 216K, a setting input wire such as 217A or 217K, an output wire such as 218A or 218K, an input resistor such as R96A or R96K, and a pair of gating rectifiers such as MR39A and MR40A, or MR39K and MR40K. Each marking input terminal as just referred to is connected to the backward-marking wire 127 of the terminal trunk concerned, as indicated in the case of the particular marking input terminal 216A in the figure. Each setting input wire as just referred to is connected to the relevant output wire (188) of the particular combined gate (G12 and G30) which corresponds to the primary basic switch to which the terminal trunk concerned is connected, as indicated in the case of the particular setting input wire 217A in the figure. Each output wire as just referred to is connected to the relevant input wire 130 of the fourth electronic storage circuit ES4A, as indicated in the case of the particular output wire 218A in the figure. The relevant input wire 130 is of course the one which corresponds to the particular column of vertical units in which the terminal trunk concerned is connected. There is a combined gate (G12 and G30) for each primary basic switch. Each such gate comprises a cold-cathode gas-filled triode such as 1V28 or 10V28, an input terminal such as 1Q or 10Q, an input resistor such as 1R98 or 10R98, a cathode resistor such as 1R99 or 10R99, and an output resistor such as 1R100 or 10R100. The input terminal of each combined gate is connected to the wire 38W corresponding to the primary basic switch concerned, as indicated in the case of the particular input terminal 1Q in the figure. The output resistor of each combined gate is directly connected between the cathode of the valve of the gate and a first output wire which constitutes the output wire (188) associated with the relevant gates G13. A second output wire (such as 1CL or 10CL) which constitutes the output wire (230) associated with the relevant gates G14 is directly connected to the cathode of the valve of the combined gate. The arrangement has a supply terminal 219 which is connected to the restoring wire 19W, and a control output terminal 220 which is connected to the control wire 184. The anodes of the valves of the combined gates are connected to this terminal over a common resistor R101. For each column of vertical units with which it is concerned, the fourth electronic storage circuit ES4A comprises a cold-cathode gas-filled triode. Only two such triodes, designated 1V29 and 10V29, are shown. In the case of each such triode, the electromagnetic relay KAW corresponding to the relevant column of vertical units is connected in the cathode circuit, which also includes a series resistor (such as 1R102 or 10R102). In the figure, the relay KAW controlled by the triode 1V29 is designated 1KAW, and the relay KAW controlled by the triode 10V29 is designated 10KAW. The inductive winding of each relay is shunted by a non-inductive shunt as shown in the figure. Each triode of the storage circuit ES4A has its trigger electrode connected over an individual input resistor (such as 1R103 or 10R103) to an input wire which, as indicated in the case of the particular triode 1V29 in the figure, constitutes the input wire 130 corresponding to the column of vertical units concerned. All the triodes of the storage circuit ES4A have their anodes connected to the supply terminal 219 over a common resistor R104. Each such triode has its cathode connected to a control output wire such as 1KL or 10KL which constitutes the relevant control wire 186, as indicated in the case of the particular control output wire 1KL in the figure. The control output terminal 220 is connected to the junction between two resistors R105 and R106 which are connected in series between the anodes of the valves of the storage circuit and 100 volts negative. There is a gate G14 for each primary-side terminal trunk of the intermediate link frame. Each such gate comprises a first setting input wire such as 222A or 222J, a second setting input wire such as 223A or 223J, an output terminal such as 221A or 221J, an output resistor such as R97A or R97J, and a pair of gating rectifiers such as MR41A and MR42A, or MR41J and MR42J. Each first setting input wire as just referred to is connected to the wire 230 corresponding to the primary basic switch to which the terminal trunk concerned is connected, as indicated in the case of the particular first setting input wire 222A in the figure. Each second setting input wire as just referred to is connected to the wire 186 corresponding to the column of vertical units in which the terminal trunk concerned is connected, as indicated in the case of the particular second setting input wire 223A in the figure. Each output terminal as just referred to is connected to the setting wire 187 of the terminal trunk concerned, as indicated in the case of the particular output terminal 221A in the figure. Normally, all the triodes of the combined gates (G12 and G30) and the fourth electronic storage circuit ES4A are in the non-conducting condition. The appearance of a backward-marking condition (50 volts positive) at a marking input terminal (such as 216A) does not in itself cause the associated triode (such as 1V29) of the storage circuit to fire. This is owing to the effect of the connection made, within the relevant combined gate, to the setting input wire (such as 217A) of the gate G13 concerned, which connection normally operates to maintain the potential of the trigger electrode of the last-mentioned triode at 100 volts negative. When a positive-going pulse, constituting a setting-initiating condition, appears at an input terminal (such as 1Q) of a combined gate (G12 and G30), the triode of this gate fires, with the consequence that the potential of the setting input wire (such as 217A) of each gate G13 associated with this combined gate is raised. In each gate G13 in which the potential of the setting input wire (such as 217A) is thus raised, and in which the condition also obtains that the marking input terminal (such as 216A) is at the backward-marking potential of 50 volts positive, the potential of the output wire (such as 218A) assumes a value which tends to cause the associated triode (such as 1V29) of the storage circuit ES4A to fire. By reason of the presence of the common anode resistor R104, only one valve of the storage circuit ES4A actually fires in respect of a pulse appearing at an input terminal (such as 1Q) of a combined gate (G12 and G30). Such firing increases the potential of the relevant control output wire (such as 1KL), and also brings about the operation of the relevant relay KAW (such as 1KAW). The increase of the potential of the relevant control output wire affects the second setting input wires (such as 223A) of all the gates G14 associated with the column of vertical units concerned. In the particular one of the gates G14 thus affected which corresponds to the primary-side terminal trunk concerned, the potential of the first setting input wire (such as 222A) has been raised by the firing of the triode of the relevant combined gate, and the potential of the output terminal (such as 221A) of this particular gate G14 therefore rises to a value constituting a setting-initiating condition. The firing of a valve of the storage circuit as just described causes a lowering of the potential of the control output terminal 220, this lowering being sufficient to constitute the relevant signal condition.

Referring again to Figs. 20A and 20B, the elements of these figures which do not wholly correspond to elements of Figs. 3A and 3B, and for which suitable forms are not shown in Fig. 21, may take forms which will now be briefly indicated. The elements G15, BMA2, and I9 may take forms similar to the respective forms illustrated in Figs. 11 and 12 for the elements G6, BMA, and I5 respectively of Fig. 3B. The storage circuit ES1A may take the same form as that illustrated in Fig. 15 for the storage circuit ES1 of Fig. 3B except that no provision for producing an inhibiting condition at a control output terminal is required. The differentiating circuit element E2 may take the same form as that shown in Fig. 18 for the element B1 of Fig. 3A, except that the resistor is connected to 100 volts negative instead of to earth.

Referring now to Figs. 22A and 22B, these when placed side by side with Fig. 22B to the right of Fig. 22A together constitute a schematic circuit diagram of an intermediate link frame IF (Fig. 2) and its control circuit, the control circuit being of an alternative form. The schematic circuit diagram is of the so-called functional type. To avoid unnecessary detailed description, each element of Figs. 22A and 22B which wholly corresponds to an element of Figs. 3A and 3B is given the same designation as the corresponding element of Figs. 3A and 3B with the addition of the suffix X. Each terminal trunk and each link includes a positive line wire (116X, 121X, 124X), a negative line wire (117X, 122X, 125X), a private or "P" wire (118X, 123X, 126X), and a backward-marking or "BM" wire (189, 29X, 40X). Each terminal trunk also includes a setting or "S" wire (190, 30X). Each primary basic switch has individual to it a backward-marking or "BM" wire 16X. Each link has individual to it a backward-marking gate I4X which controls the extension of a backward-marking condition from the backward-marking wire 16X of the relevant primary basic switch to the backward-marking wire 40X of the link. Each secondary basic switch has individual to it a backward-marking or "BM" wire 27X, and a backward-marking gate I5B the function of which will be referred to shortly. Each secondary-side terminal trunk has individual to it a backward-marking gate I6X which controls the extension of a backward-marking condition from the backward-marking wire 27X of the relevant secondary basic switch to the backward-marking wire 29X of the trunk. The control circuit includes a time-division-multiplex system. Each primary basic switch has a backward-marking multiplex MX2B individual to it, and each secondary basic switch has a backward-marking multiplex MX4 individual to it. The backward-marking multiplex MX2B of a primary basic switch has an input wire for each terminal trunk of the switch, and the backward-marking multiplex MX4 of a secondary basic switch has an input wire for each link connected to the switch, the input wires being in each case constituted by the respective backward-marking wires (189, 40X). The output pulse highway 7X of the backward-marking multiplex MX2B of a primary basic switch is connected over a pulse-selection gate G2X to a selection pulse highway 18X common to all the primary basic switches of the link frame, and has associated with it a backward-marking pulse lengthener L2X having an output wire which constitutes the backward-marking wire 16X previously referred to. The output pulse highway 192 of the backward-marking multiplex MX4 of a secondary basic switch is connected over a pulse-selection gate G17 to a selection pulse highway 193 common to all the secondary basic switches of the link frame, and has associated with it, through the medium of the relevant gate I5B, a backward-marking pulse lengthener L4 having an output wire which constitutes the backward-marking wire 27X previously referred to. The control circuit includes four electronic storage circuits which serve to record the same things as the four storage circuits of a primary link frame. The first and second of these storage circuits, corresponding to the storage circuits ES1 and ES2 of Fig. 3B, and also associated isolating gates corresponding to the gates G8 and G9 of Fig. 3B, are for simplicity represented by a single block ESS in Fig. 22B. The appearance of a setting-initiating condition (earth) on the setting or "S" wire 30X of a secondary-side terminal trunk of the link frame produces the results, provided that the first and second electronic storage circuits are at normal, that the relevant cold-cathode valve of the first storage circuit is fired and initiates the operation of the relay KDX corresponding to the column of vertical units concerned, and that the relevant cold-cathode valve of the second storage circuit is fired and initiates the operation of the relay KCX corresponding to the secondary basic switch concerned and causes a setting-initiating condition to be applied to a control wire 35B corresponding to this switch. During periods in which the first electronic storage circuit is off normal, it produces an inhibiting condition on a control wire 41X, thereby causing the backward-marking gates I5B of all the secondary basic switches of the link frame to block the extension of pulses to the backward-marking pulse lengtheners L4 of these switches. The third electronic storage circuit ES3B has an input circuit constituted by the selection pulse highway 193 associated with the secondary basic switches of the link frame. For each primary basic switch of the link frame, this storage circuit comprises a cold-cathode valve. The application of a setting-initiating condition to a control wire 35B opens the pulse-selection gate G17 of the secondary basic switch to which this wire 35B corresponds, with the result, provided that the storage circuit ES3B is at normal, that the first pulse present on the output pulse highway 192 of the backward-marking multiplex MX4 of this switch subsequent to the opening of this gate G17 brings about the firing of the cold-cathode valve corresponding to the link, and therefore to the particular primary basic switch, concerned. This firing initiates the operation of the relevant relay KBX, and causes a setting-initiating condition to be applied to a control wire 38X corresponding to the primary basic switch concerned. The fourth electronic storage circuit ES4B has an input circuit constituted by the selection pulse highway 18X associated with the primary basic switches of the link frame. For each column of vertical units with which it is concerned, this storage circuit comprises a cold-cathode valve. The application of a setting-initiating condition to a control wire 38X opens the pulse-selection gate G2X of the primary basic switch to which this wire 38X corresponds, with the result, provided that the storage circuit ES4B is at normal, that the first pulse present on the output pulse highway 7X of the backward-marking multiplex MX2B of this switch subsequent to the opening of this gate G2X brings about the firing of the cold-cathode valve corresponding to the column of vertical units concerned. This firing initiates the operation of the relevant relay KAX, and causes a setting-initiating condition to be applied to a control wire 194 corresponding to the column of vertical units concerned. The contact arrangements for operating the select magnets and for operating and holding the hold magnets are similar to those of Figs. 3A and 3B. For each primary-side terminal trunk of the link frame, there is a setting-wire gate G16 which serves to apply a setting-initiating condition to the setting wire 190 of the trunk in response to the concurrent existence of setting-initiating conditions on the particular wires 38X and 194 which correspond to the trunk. The storage circuit ES4 has an output wire 21X on which a steady control-set condition is produced for as long as the storage circuit is off normal, and which is connected, over a differentiating circuit element B1X, to an intermediate link frame control-set wire 22X.

Still referring to Figs. 22A and 22B, when the positive voltage backward-marking condition appears on the backward-marking wire 189 of a primary-side terminal trunk of the intermediate link frame, the backward-marking multiplex MX2B individual to the primary basic switch concerned produces on its output pulse highway 7X the pulse train pertaining to the trunk. The backward-marking pulse lengthener L2X connected to the pulse highway 7X consequently produces a positive voltage backward-marking condition on its output wire 16X, and this condition is extended to the backward-marking wire 40X of each free link connected to the particular primary basic switch. As regards each free link concerned, when the positive voltage condition appears on the backward-marking wire 40X of the link, the backward-marking multiplex MX4 individual to the secondary basic switch concerned produces on its output pulse highway 192 the pulse train pertaining to the link. Provided that the first electronic storage circuit is at normal, this pulse train is extended through the relevant backward-marking gate I5B to the backward-marking pulse lengthener L4 individual to the particular secondary basic switch, with the result that this pulse lengthener produces a positive voltage backward-marking condition on its output wire 27X. From this wire, the backward-marking condition is further extended through the relevant gates I6X to the backward-marking wire 29X of each free terminal trunk connected to the particular secondary basic switch. When, as a consequence of the extension of the backward-marking condition, a setting-initiating condition (earth) appears on the setting wire 30X of a backward-marked secondary-side terminal trunk, each of the four electronic storage circuits is set and initiates the operation of an appropriate electromagnetic relay, as will be clear from the description already given. In response to the setting of the storage circuits ES3B and ES4B, the gate G16 associated with the primary-side terminal trunk concerned applies a setting-initiating condition to the setting wire 190 of this trunk. In response to the setting of the storage circuit ES4B, the differentiating circuit element B1X applies a control-set condition for a brief period to the intermediate link frame control-set wire 22X. The further operation will be clear from the description already given.

Still referring to Figs. 22A and 22B, the elements of these figures, which do not wholly correspond to elements of Figs. 3A and 3B may take forms which will now be briefly indicated. The multiplex MX2B may be constituted of similar components to the multiplex illustrated in Fig. 5 except that the valve is a triode, the manner of connection of the components and the source of pulses connected to the pulse supply terminal being such that the multiplex responds to positive voltage backward-markings. In order to cause it to produce positive output pulses, the triode has to be connected to constitute an amplifier of the so-called cathode-follower type. The multiplex MX4 may take the same form as the multiplex MX2B. The gate I5B may take the same form as that illustrated in Fig. 13 for the gate I6 of Fig. 3B. The pulse lengthener L4 may take the same form as that illustrated in Fig. 8 for the pulse lengthener L2 of Fig. 3A. The gate G16 may take the same form as that illustrated in Fig. 21 for the gate G14 of Fig. 20A. The gate G17 may take the same form as that illustrated in Fig. 10 for the gate G2 of Fig. 3A. The first and second storage circuits and the associated isolating gates, all represented by the single block ESS in Fig. 22B, may take the same form as that illustrated in Fig. 15 for the corresponding elements of Fig. 3B, except that the second storage circuit has to produce a steady increase of potential at the relevant setting output terminal upon the firing of a constituent cold-cathode valve. The storage circuits ES3B and ES4B may each take the same form as that illustrated in Fig. 17 for the storage circuit ES4 of Fig. 3A, except that each has to produce a steady increase of potential from a negative value to earth potential at a relevant setting output terminal upon the firing of a constituent cold-cathode valve.

Referring now to Figs. 23A, and 23B, these when placed side by side with Fig. 23B to the right of Fig. 23A together constitute a circuit diagram showing the incoming link circuit ILC (Fig. 2) associated with a primary-side terminal trunk of an incoming secondary link frame ISF (Fig. 2), and also showing a schematic circuit diagram of such a link frame ISF and its control circuit, this schematic circuit diagram being of the so-called functional type.

The incoming link circuit is that part of Fig. 23A which is included in the chain-line rectangle ILCD. The wires 121, 122, 123, 28, and 30 of this circuit are connected to the corresponding wires of the relevant primary link frame secondary-side terminal trunk (Fig. 3B). Wires 28 and 30 pass straight through the incoming link circuit, being connected to corresponding wires of the relevant register secondary link frame primary-side terminal trunk. Wires 121, 122, 123, 196, 197, 198, 199, and 195 are connected to corresponding wires of the last-mentioned primary-side terminal trunk. Wires 116Y, 117Y, and 118Y are connected to corresponding wires of the relevant incoming secondary link frame primary-side terminal trunk. Wire 195 passes straight through the incoming link circuit, being connected to a corresponding wire of the last-mentioned incoming secondary link frame primary-side terminal trunk. The switching relay H of the link circuit has three contacts h1, h2, and h3. The functions of the link circuit were described with reference to Fig. 2.

Still referring to Figs. 23A and 23B, only typical elements of the incoming secondary link frame concerned and its control circuit are represented in the schematic circuit diagram constituted by these figures. To avoid unnecessary detailed description, each element of Figs. 23A and 23B which wholly corresponds to an element of Figs. 3A and 3B is given the same designation as the corresponding element of Figs. 3A and 3B with the addition of the suffix Y. Each terminal trunk and each link includes a positive line wire (116Y, 121Y, 124Y), a negative line wire (117Y, 122Y, 125Y), and a private or "P" wire (118Y, 123Y, 126Y), and each terminal trunk includes a setting or "S" wire (195, 201). Each secondary-side terminal trunk also includes a backward-marking or "BM" wire 200. Each secondary basic switch has individual to it a backward-marking or "BM" wire 203, and a backward-marking gate I10 which controls the extension of a backward-marking condition, from the backward-marking wire 200 of any of the secondary-side terminal trunks connected to the switch, to the said backward-marking wire 203. Each of the backward-marking wires 200 concerned is linked to the gate I10 by an isolating gate G18 and an amplifier BMA3, there being a gate G18 for each of these wires and the amplifier BMA3 being common to all of them. Each link has individual to it a backward-marking or "BM" wire 202, and a backward-marking gate I4C which controls the extension of a backward-marking condition, from the backward-marking wire 203 of the revelant secondary basic switch, to the said backward-marking wire 202. The control circuit of the link frame includes four electronic storage circuits, namely a first electronic storage circuit ES1C which serves to record which particular column of vertical units of primary basic switches is concerned when a setting-initiating condition is received over a primary-side terminal trunk of the link frame, a second electronic storage circuit ES2C which serves to record which particular primary basic switch is concerned when a setting-initiating condition is so received, a third electronic storage circuit ES3C which serves to choose and record which particular secondary basic switch is to be used when a setting-initiating condition is so received, and a fourth electronic storage circuit ES4C which serves to choose and record which particular column of vertical units of secondary basic switches is concerned when a setting-initiating condition is so received. For each column of vertical units with which it is concerned, the first electronic storage circuit ES1C comprises an input wire 205 and a cold-cathode gas-filled valve which is connected to control a slow-operating electromagnetic relay KAY corresponding to the column. For each of the ten primary basic switches of the link frame, the second electronic storage circuit ES2C comprises an input wire 206 and a cold-cathode gas-filled valve which is connected to control an electromagnetic relay KBY corresponding to the primary basic switch. The appearance of a setting-initiating condition (earth) on the setting wire 195 of a primary-side terminal trunk of the link frame causes a setting-initiating condition to be applied, by way of isolating gates G19 and G20 individual to the trunk, to the relevant input wires 205 and 206 of the first and second storage circuits ES1C and ES2C, with the result, provided that these storage circiuts are at normal, that the relevant cold-cathode valves of these storage circuits are fired and initiate the operation of the corresponding electromagnetic relays. The firing of a cold-cathode valve of the second storage circuit ES2C causes a setting-initiating condition to be applied to a control wire 209 corresponding to the primary basic switch concerned. For each of the ten secondary basic switches of the link frame, the third electronic storage circuit ES3C comprises an input wire 207 and a cold-cathode gas-filled valve which is connected to control an electromagnetic relay KCY corresponding to the secondary basic switch. Provided that the storage circuit ES4C is at normal, the application of a setting-initiating condition to a wire 209 corresponding to a primary basic switch (as a result of the firing of the cold-cathode valve of the storage circuit ES2C) causes a setting-initiating condition to be applied to each of the input wires 207 which corresponds to a secondary basic switch in which the link to the primary basic switch concerned is free and backward-marked. This has the result that the cold-cathode valve corresponding to one, and one only, of these input wires 207 is fired and initiates the operation of the corresponding relay KCY and causes a setting-initiating condition to be applied to an output wire 210 corresponding to the secondary basic switch concerned. The association between the wire 209 corresponding to a primary basic switch and an input wire 207 of the storage circuit ES3C is by way of a gate G21, individual to the primary basic switch, and a gate G22 individual to the link between this primary basic switch and the secondary basic switch to which the input wire 207 corresponds. There is a gate G22 for each link of the incoming secondary link frame. The gate G22 individual to a link is arranged so that the application of a setting-initiating condition to the associated wire 209 (with the consequent application of a setting-initiating condition to the associated wire 212) only causes a setting-initiating condition to be applied to the associated wire 207 if a backward-marking exists on the backward-marking wire 202 of the link. For each column of vertical units of the secondary basic switches of the link frame, the fourth electronic storage circuit ES4C comprises an input wire 208 and a cold-cathode gas-filled valve which is connected to control an electromagnetic relay KDY corresponding to the column. The application of a setting-initiating condition to a wire 210 corresponding to a secondary basic switch (as a result of the firing of the cold-cathode valve of the storage circuit ES3C) causes a setting-initiating condition to be applied to each of the input wires 208 which corresponds to a column of vertical units in which the terminal trunk connected to the vertical unit of the secondary basic switch concerned is backward-marked. This has the result, provided that the storage circuit ES4C is at normal, that the cold-cathode valve corresponding to one, and one only, of these input wires is fired and initiates the operation of the corresponding relay KDY and causes a setting-initiating condition to be applied to an output wire 211 corresponding to the column of vertical units concerned. The association between the wire 210 corresponding to a secondary basic switch and an input wire 208 of the storage circuit ES4C is by way of a gate G23, individual to the secondary basic switch, and a gate G24 individual to the terminal trunk which is connected to the particular vertical unit of this switch to which the input wire 208 corresponds. During periods in which the storage circuit ES4C is off normal, it produces an inhibiting condition on a control wire 214, thereby causing the backward-marking gates I10 of all the secondary basic switches of the incoming secondary link frame to block the extension of the backward-marking condition to the backward-marking wire 203 of these switches. The presence of the inhibiting condition on the wire 214 serves, indirectly, to cause all the gates G22 to assume the blocking condition. The gate G24 individual to a secondary-side terminal trunk is arranged so that the application of a setting-initiating condition to the associated wire 210 (with the consequent application of a setting-initiating condition to the associated wire 213) only causes a setting-initiating condition to be applied to the associated wire 208 if a backward-marking exists on the backward-marking wire 200 of the trunk. For each secondary-side terminal trunk of the link frame, there is a setting-wire gate G25 which serves to apply a setting-initiating condition to the setting wire 201 of the trunk in response to the concurrent existence of setting-initiating conditions on the particular wires 210 and 211 which correspond to the trunk. The association between the wire 210, corresponding to a secondary basic switch, and the gate G25 is by way of a gate G28 individual to the secondary basic switch and having an output wire 215. The control circuit includes a signalling gate G27 which serves to produce a control-not-busy condition on a signal wire 204 during periods in which the condition obtains that a backward-marking condition exists on the backward-marking wire 203 of any secondary basic switch of the link frame and a setting-initiating condition exists on the setting wire 195 of any primary-side terminal trunk of the link frame. The signal wire 204 is connected to the marker, and constitutes the control-set wire of the link frame, the cessation (after its appearance) of the control-not-busy condition, as a consequency of the appearance of the inhibiting condition on the control wire 214, serving to constitute the control-set condition. The association between the setting wire 195 of a primary-side terminal trunk and the gate G27 is by way of an isolating gate G26, individual to the terminal trunk, and an amplifier AMP common to all the primary-side terminal trunks of the link frame. The backward-marking wire 203 of each secondary basic switch is associated with the gate G27 through the medium of an isolating gate G29 individual to the switch. The contact arrangements for operating the select magnets and for operating and holding the hold magnets are similar to those of Figs. 3A and 3B.

Still referring to Figs. 23A and 23B, when the positive voltage backward-marking condition appears on the backward-marking wire 200 of a secondary-side terminal trunk of the incoming secondary link frame, this condition is extended (assuming that the storage circuit ES4C is at normal) over the gate G18, individual to the trunk, and the amplifier BMA3 and gate I10, individual to the relevant secondary basic switch, to the backward-marking wire 203 of this switch. From the wire 203, the positive voltage backward-marking condition is further extended to the backward-marking wire 202 of each free link connected to the particular secondary basic switch, the extension of this condition to an engaged link being blocked by the relevant gate I4C. When a setting-initiating condition (earth) appears on the setting-wire 195 of a primary-side terminal trunk, each of the four electronic storage circuits ES1C, ES2C, ES3C, and ES4C is set and initiates the operation of an appropriate electromagnetic relay, as will be clear from the description already given. In response to the setting of the storage circuits ES3C and ES4C, the gate G25 associated with the secondary-side terminal trunk concerned applies a setting-initiating condition to the setting wire 201 of this trunk. The further operation will be clear from the description already given.

Referring now to Fig. 24, this shows the form which the gates G26, G27, and G29 and the amplifier AMP in Figs. 23A and 23B may together take. Two gates G26 and one gate G29 are represented. There is a gate G26 for each primary-side terminal trunk of the incoming secondary link frame. Each such gate comprises an input terminal such as 224A or 224B, and a gating rectifier such as MR43A or MR43B. Each input terminal as just referred to is connected to the setting wire 195 of the terminal trunk concerned, as indicated in the case of the particular input terminal 224A in the figure. All the gates G26 have their gating rectifiers connected to the wire 226, which in the case of the gating and amplifying arrangement now being described forms a first input wire of a combined amplifier and gate which constitutes the amplifier AMP and gate G27. The combined amplifier and gate comprises a pentode V30 and two resistors R107 and R109. The wire 226 is connected to the control grid of the pentode, and is also connected to 50 volts negative through the resistor R107. The pentode has the resistor R109 connected in the anode circuit as a load resistor, and has its anode connected to an output terminal 229. The last-mentioned terminal is connected to the signal wire 204. The suppressor grid of the pentode is connected to the wire 228, which in the case of the gating and amplifying arrangement now being described forms a second input wire of the combined amplifier and gate referred to. There is a gate G29 for each secondary basic switch. Each such gate comprises an input terminal 225, two resistors R111 and R112, and a gating rectifier MR44. Each input terminal as just referred to is connected to the backward-marking wire 203 of the secondary basic switch concerned. All the gates G29 have their gating rectifiers connected to the wire 228. Normally, all the input terminals such as 224A are at a potential of 50 volts negative, and all the input terminals 225 are at earth potential, and no substantial anode current flows in the pentode V30. When a setting-initiating condition (earth) appears on the setting or "S" wire 195 connected to an input terminal such as 224A, the voltage thereby produced across the resistor R107 brings the potential of the control grid of the pentode V30 to a value at which substantial anode current flows if, and only if, the potential of the suppressor grid is at the time less negative than normal by reason of the fact that one or more of the input terminals 225 are at the backward-marking potential of 50 volts positive. When substantial anode current is thus caused to flow, the potential of the output terminal 229 changes from its normal value of 100 volts positive to a lower value which constitutes the control-not-busy condition. As soon as the appearance of the setting-initiating condition has brought about the setting of the storage circuits of the incoming secondary link frame, with the consequence that all the backward-marking gates I10 of all the secondary basic switches of this link frame are brought to the blocking condition, then the fact that a backward-marking condition no longer exists at any input terminal 225 causes the valve V30 to be brought to its normal anode current cut-off condition. Thus the control-not-busy condition on the signal wire 204 is terminated to constitute the control-set condition.

Referring again to Figs. 23A and 23B, the elements of these figures which do not wholly correspond to elements of Figs. 3A and 3B, and for which suitable forms are not shown in Fig. 24, may take forms which will now be briefly indicated. The elements G18, BMA3, and I10 may take forms similar to the respective forms illustrated in Figs. 11 and 12 for the elements G6, BMA, and I5 respectviely of Fig. 3B. The gate I4C may take the same form as that illustrated in Fig. 11 for the gate I4 of Fig. 3A. The elements ES1C, ES2C, G19, G20, ES3C, G22, and G21 may take forms similar to the respective forms illustrated in Figs. 15 and 16 for the elements ES1, ES2, G8, G9, ES3, G1, and G10 respectively of Figs. 3A and 3B. The elements ES4C, G23, G24, G28, and G25 may take forms similar to the respective forms illustrated in Fig. 21 for the elements ES4A, G12, G13, G30, and G14 respectively of Figs. 20A and 20B.

The marker MK (Fig. 2) and the registers RG (Fig. 2) should preferably be arranged so that, when a register acquires the use of the marker for a call and the immediate appropriation of a backward-marked path for the call is not possible owing to the fact that at least one of the link frame control circuits concerned is engaged in dealing with another call, the marker is held by the register concerned for a brief period to enable the appropriation of a backward-marked path for the call to take place.

In one possible modification of the selecting arrangements which have been described which is contemplated, link frames are constituted by connecting the vertical units of primary basic switches by links to the vertical units of secondary basic switches, the terminal trunks being connected to the horizontal levels of the basic switches.

In other possible modifications which are contemplated, the use of electromagnetic relays is avoided by operating the select and hold magnets directly by valve currents. The select magnets may each have two windings arranged to be traversed by the currents of the relevant valves of the second and third electronic storage circuits, the magnet only operating when each of its windings is energised. The hold magnets may each have two windings arranged in this way and a further winding for holding purposes.

What is claimed is:

1. In an automatic exchange system, a primary link frame comprising a plurality of primary basic switches linked to a plurality of secondary basic switches by a plurality of links, each of said primary basic switches being linked to each of said secondary basic switches, a control circuit individual to said link frame, primary-side terminal trunks pertaining to the line circuit side of said link frame, secondary-side terminal trunks pertaining to the other side of said link frame, a forward-marking wire in each said primary-side terminal trunk marked in response to the assumption of the calling condition by the line to which the terminal trunk is connected, a backward-marking wire in each said primary-side terminal trunk marked by a marker when the line to which the terminal trunk is connected is called, a forward-marking wire in each said link, a backward-marking wire in each said link, means for extending a marking condition from the forward-marking wire of a said primary-side terminal trunk to the forward-marking wire of each free link connected to the particular said primary basic switch to which this marked primary-side terminal trunk is connected, means for extending a marking condition from the backward-marking wire of a said primary-side terminal trunk to the backward-marking wire of each free link connected to the particular said primary basic switch to which this marked primary-side terminal trunk is connected, means for inhibiting the extension of a marking condition from the forward-marking wire of a said primary-side terminal trunk during a period in which a marking condition is being extended from the backward-marking wire of a said primary-side terminal trunk, a forward-marking wire in each said secondary-side terminal trunk, a backward-marking wire in each said secondary-side terminal trunk, means for extending a marking condition from the forward-marking wire of a said link to the forward-marking wire of each free secondary-side terminal trunk connected to the particular said secondary basic switch to which this marked link is connected, means for extending a marking condition from the backward-marking wire of a said link to the backward-marking wire of each free secondary-side terminal trunk connected to the particular said secondary basic switch to which this marked link is connected, and storage equipment in said control circuit responsive to the receipt of a setting-initiating condition over a said secondary-side terminal trunk to which a marking condition has been extended and comprising means for recording the identity of the particular said secondary-side terminal trunk over which a setting-initiating condition has been received and means for appropriating and recording the identity of a marked link connected to the particular said secondary basic switch to which this particular said secondary-side terminal trunk is connected and means for recording the identity of a marked primary-side terminal trunk connected to the particular said primary basic switch to which the link so appropriated is connected.

2. In an automatic exchange system, a link frame, other than a primary link frame, comprising a plurality of primary basic switches linked to a plurality of secondary basic switches by a plurality of links, each of said primary basic switches being linked to each of said secondary basic switches, a control circuit individual to said link frame, terminal trunks pertaining to one side of said link frame, terminal trunks pertaining to the other side of said link frame, a backward-marking wire in each said terminal trunk pertaining to said one side, a backward-marking wire in each said link, means for extending a marking condition from the backward-marking wire of a said terminal trunk pertaining to said one side to the backward-marking wire of each free link connected to the particular basic switch of said link frame to which this marked terminal trunk is connected, a backward-marking wire in each said terminal trunk pertaining to said other side, means for extending a marking condition from the backward-marking wire of a said link to the backward-marking wire of each free terminal trunk, pertaining to said other side, that is connected to the particular basic switch on said other side to which this marked link is connected, and storage equipment in said control circuit responsive to the receipt of a setting-initiating condition over a said terminal trunk pertaining to said other side to which a marking condition has been extended and comprising means for recording the identity of the particular said terminal trunk pertaining to said other side over which a setting-initiating condition has been received and means for appropriating and recording the identity of a marked link connected to the particular basic switch of said link frame to which this particular said terminal trunk pertaining to said other side is connected and means for appropriating and recording the identity of a marked terminal trunk, pertaining to said one side that is connected to the particular basic switch on said one side to which the link so appropriated is connected and means for extending a setting-initiating condition over the terminal trunk, pertaining to said one side, so appropriated.

References Cited in the file of this patent
UNITED STATES PATENTS

| | | |
|---|---|---|
| 2,490,833 | Ransom | Dec. 13, 1949 |
| 2,619,548 | Lesti | Nov. 25, 1952 |
| 2,688,662 | Den Hertog et al. | Sept. 7, 1954 |
| 2,787,664 | Gaugain | Apr. 2, 1957 |